United States Patent
Takenaka et al.

(10) Patent No.: US 7,409,265 B2
(45) Date of Patent: Aug. 5, 2008

(54) LEG-TYPE MOVING ROBOT AND FLOOR REACTION FORCE DETECTION DEVICE THEREOF

(75) Inventors: Toru Takenaka, Wako (JP); Hiroshi Gomi, Wako (JP); Satoshi Shigemi, Wako (JP); Takashi Matsumoto, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 757 days.

(21) Appl. No.: 10/500,117

(22) PCT Filed: Dec. 19, 2002

(86) PCT No.: PCT/JP02/13295

§ 371 (c)(1),
(2), (4) Date: Jun. 25, 2004

(87) PCT Pub. No.: WO03/057421

PCT Pub. Date: Jul. 17, 2003

(65) Prior Publication Data

US 2005/0080511 A1    Apr. 14, 2005

(30) Foreign Application Priority Data

Dec. 28, 2001  (JP)  ............................. 2001-401491

(51) Int. Cl.
*G06F 19/00*  (2006.01)
(52) U.S. Cl. ...................... 700/245; 700/258; 700/260; 700/251; 180/8.1; 318/568.12; 318/568.1; 318/568.16; 318/568.17; 318/568.2; 901/33
(58) Field of Classification Search ................. 700/245, 700/246; 180/8.1; 318/568.12; 901/33
See application file for complete search history.

(56) References Cited

U.S. PATENT DOCUMENTS 4,618,822 A * 10/1986 Hansen .................. 324/207.16

(Continued)

FOREIGN PATENT DOCUMENTS

JP        5-264375 A    10/1993

(Continued)

OTHER PUBLICATIONS

Tomokazu Kato, "Fukusushu no Sensor o Mochiita Foot-tsuki Toritsu Niju Furiko no Seigyo", The Robotics Society of Japan Gakujutsu Koenkai Yokoshu, Sep. 9, 19999, vol. 17, seperate vol. 3, pp. 999-1000.

*Primary Examiner*—Thomas G. Black
*Assistant Examiner*—Wae Louie
(74) *Attorney, Agent, or Firm*—Squire, Sanders & Dempsey L.L.P.

(57) ABSTRACT

It is arranged such that displacement sensors (70) are installed at a position in or vicinity of elastic members (382), to generate outputs indicating a displacement of the floor contact end of a foot (22) relative to a second joint (18, 20), and a floor reaction force acting on the foot is calculated based on the outputs of the displacement sensors by using a model describing a relationship between the displacement and stress generated in the elastic members in response to the displacement, thereby enabling to achieve accurate calculation of the floor reaction force and more stable walking of a legged mobile robot (1). Further, a dual sensory system is constituted by combining different types of detectors, thereby enabling to enhance the detection accuracy. Furthermore, since it self-diagnoses whether abnormality or degradation occurs in the displacement sensors etc. and performs temperature compensation without using a temperature sensor, the detection accuracy can be further enhanced.

20 Claims, 18 Drawing Sheets

U.S. PATENT DOCUMENTS

| | | | | |
|---|---|---|---|---|
| 5,221,883 A * | 6/1993 | Takenaka et al. | ....... | 318/568.12 |
| 5,255,753 A * | 10/1993 | Nishikawa et al. | ........... | 180/8.6 |
| 5,404,086 A * | 4/1995 | Takenaka et al. | ....... | 318/568.12 |
| 5,416,393 A * | 5/1995 | Gomi et al. | .............. | 318/568.2 |
| 5,808,433 A * | 9/1998 | Tagami et al. | .......... | 318/568.12 |
| 6,243,623 B1 * | 6/2001 | Takenaka et al. | ............ | 700/245 |
| 6,377,014 B1 * | 4/2002 | Gomi et al. | ........... | 318/568.12 |
| 6,656,135 B2 * | 12/2003 | Zogbi et al. | ................. | 600/594 |
| 6,920,374 B2 * | 7/2005 | Takenaka et al. | ............ | 700/245 |
| 6,963,185 B2 * | 11/2005 | Takenaka et al. | ....... | 318/568.12 |
| 2003/0125839 A1 * | 7/2003 | Takenaka et al. | ............ | 700/245 |
| 2004/0238240 A1 * | 12/2004 | Hirose et al. | ................. | 180/8.1 |
| 2005/0011685 A1 * | 1/2005 | Takenaka et al. | ............. | 180/8.6 |
| 2005/0080511 A1 * | 4/2005 | Takenaka et al. | ............ | 700/245 |

FOREIGN PATENT DOCUMENTS

| | | |
|---|---|---|
| JP | 8-52675 A | 2/1996 |
| JP | 11-160150 A | 6/1999 |
| JP | 2000-254888 | 9/2000 |
| JP | 2001-264132 A | 9/2001 |
| JP | 2002-337076 A | 11/2002 |
| WO | WO 01/74546 A1 | 10/2001 |

\* cited by examiner $Fn = Fan + Fbn$
$Fan = -KaLn + C_1$
$Fbn = -Kb(Ln - Xn) + C_2$
$Fbn = -D * \dfrac{d}{dt} Xn$ FIG. 7
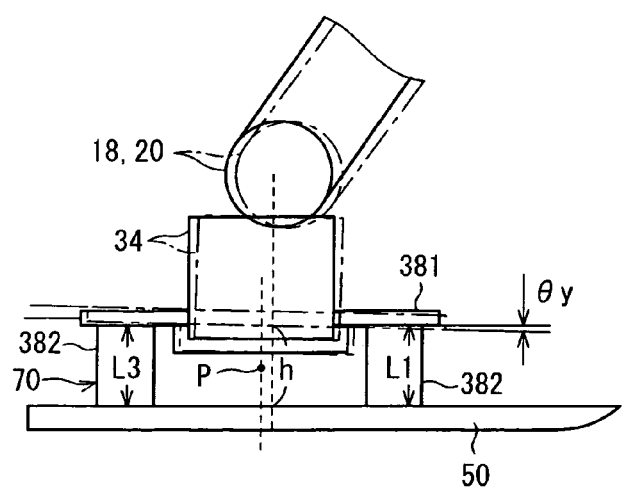
FIG. 8
(a) 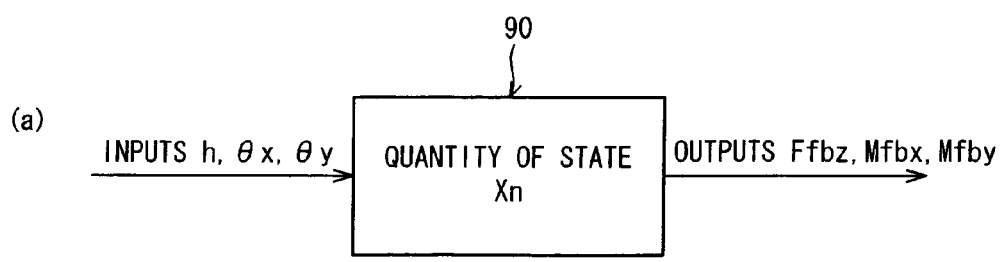
(b) 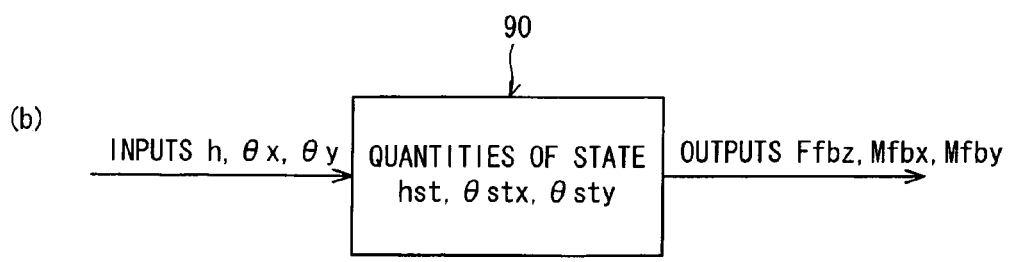

LEG-TYPE MOVING ROBOT AND FLOOR REACTION FORCE DETECTION DEVICE THEREOF

TECHNICAL FIELD TO WHICH THE INVENTION RELATES TO

This invention relates to a legged mobile robot and a floor reaction force detection system thereof.

BACKGROUND ART OF THE INVENTION

In legged mobile robots, in particular, in biped mobile robots of humanoid type, a sensor is installed at each foot to detect displacement of the foot at foot landing or floor reaction force acting on the robot from a floor surface which the robot contacts and based on the detected values, control is appropriately performed to achieve stable walking.

Japanese Laid-Open Patent Application No. Hei 5(1993)-305584 proposes a technique to install the floor reaction force sensor at each robot foot. In the prior art, a six-axis force sensor is installed between an ankle joint and a floor contact end of each foot to detect the floor reaction force acting on the foot.

Further, Journal of the Robotics Society of Japan Vol. 13, No.7, pp. 1030-1037 (October, 1995) proposes a technique to install a displacement sensor detecting the displacement of the feet. In the prior art, a foot of a similar legged mobile robot is made of an upper foot plate and a lower foot plate connected by wire to sandwich a shock absorber therebetween. Sensing elements each comprising a potentiometer (displacement sensors) are disposed at four corners of the upper foot plate, and a converter is installed at its upstream such that distance (displacement) between the upper and lower foot plates is detected through the sensing elements. In this manner, it is detected whether the foot has landed and there is a height difference (irregularity) at a landed floor area.

In the feet of the legged mobile robots, in particular, of the biped mobile robots of humanoid type, it is necessary to install an appropriate guide member to prevent the supporting leg from spinning about the vertical axis due to reaction force of swinging the free leg during robot walking. At the same time, the feet must have certain elasticity to absorb and mitigate the impact at foot landing of the free leg.

When the sensor is thus installed at each foot of the legged mobile robot, in particular, of the biped mobile robots of humanoid type, since space at the feet is limited, the displacement sensor should preferably be compact enough to be installed there. Moreover, in order to achieve a stable walking of the legged mobile robot, it is preferable to detect not only an occurrence of the foot landing but also the floor reaction force acting on the foot.

DISCLOSURE OF THE INVENTION

A first object of the invention is to provide a floor reaction force detection system of a legged mobile robot having a displacement sensor at each foot of the legged mobile robot such that the floor reaction force acting on the foot can be calculated or estimated based on the detected value.

Further, when a floor reaction force detector is installed at each foot of the legged mobile robot to detect the floor reaction force acting on the foot, if a displacement sensor is additionally installed at each foot such that the floor reaction force is calculated or estimated therefrom, this can constitute a dual sensory system by combining such different types of detectors, thereby enabling to enhance the detection accuracy.

A second object of the invention is, therefore, to provide a floor reaction force detection system of a legged mobile robot, in which in addition to the floor reaction force detector installed at each foot to detect the floor reaction force acting on the foot, a displacement sensor is installed at the foot such that the floor reaction force acting on the foot is calculated or estimated based on the detected value, to constituting a dual sensory system, thereby enabling to enhance the detection accuracy.

Further, when a displacement sensor is installed at each foot such that the floor reaction force is calculated or estimated therefrom, in addition to the floor reaction force detector installed at the foot to detect the floor reaction force acting on the foot, the floor reaction force detector is exposed to the impact at foot landing as mentioned above. In order to further improve the detection accuracy, it is preferable to self-diagnose degradation or abnormality of the floor reaction force detector from an output of the displacement sensor.

A third object of the invention is, therefore, to provide a floor reaction force detection system of a legged mobile robot, in which in addition to the floor reaction force detector installed at each foot to detect the floor reaction force acting on the foot, a displacement sensor is installed at the foot such that the floor reaction force acting on the foot is calculated or estimated based on the detected value, while enabling to self-diagnose degradation or abnormality of the floor reaction force detector from an output of the displacement sensor, thereby further improving the detection accuracy.

Furthermore, when a displacement sensor that utilize viscoelastic characteristic of an elastic member is installed at each foot such that the floor reaction force is calculated or estimated therefrom, in addition to the floor reaction force detector installed at the foot to detect the floor reaction force acting on the foot, the viscoelastic characteristic of the elastic member tends to change with temperature drift or member degradation. If a temperature sensor or the like is to be added to compensate the characteristic change, the configuration would disadvantageously be complicated.

A fourth object of the invention is, therefore, to provide a floor reaction force detection system of a legged mobile robot, in which in addition to the floor reaction force detector installed at each foot to detect the floor reaction force acting on the foot, a displacement sensor is installed at the foot such that the floor reaction force acting on the foot is calculated or estimated based on the detected value, while enabling to estimate the change of the viscoelastic characteristic due to temperature drift or degradation of the elastic member without using a temperature sensor, thereby enabling to further enhance the detection accuracy.

In order to achieve the first object, as recited in claim 1 mentioned below, the invention provides a floor reaction force detection system of a legged mobile robot having at least a body and a plurality of legs each connected to the body through a first joint and each having a foot connected to a distal end of the leg through a second joint, comprising: a displacement sensor installed at a position in or adjacent to an elastic member, that contracts in response to a load, disposed between the second joint and a floor contact end of the foot, and generating an output indicating a displacement of the floor contact end of the foot relative to the second joint; and a floor reaction force calculator that calculates a floor reaction force acting on the foot based on the output of the displacement sensor, by using a model that describes a relationship between a displacement and a stress generated in the elastic member in response to the displacement of the floor contact end of the foot. Thus, since it is arranged to install a displacement sensor at a position in or adjacent to an elastic member disposed between the second joint and a floor contact end of the foot, that generates an output indicating a displacement of the floor contact end of the foot relative to the second joint; and a floor reaction force acting on the foot is calculated based on the output of the displacement sensor, by using a model that describes a relationship between a displacement and a stress generated in the elastic member in response to the displacement of the floor contact end of the foot, the floor reaction force can be accurately calculated, thereby enabling to control the legged mobile robot to walk more stably.

As recited in claim 2 mentioned below, the invention is arranged such that the model is described with a first spring, a dumper arranged in series with the first spring and a second spring arranged in parallel with the first spring and the dumper. Since it is arranged such that the model is described with a first spring, a dumper arranged in series with the first spring and a second spring arranged in parallel with the first spring and the dumper, in other words, the model is designed by taking a dumping characteristic of the elastic member into consideration and is used, it becomes possible to obtain an estimation value of the floor reaction force exhibiting excellent frequency characteristics, in other words, it becomes possible to calculate the floor reaction force with a high response, thereby enabling to control the legged mobile robot to walk more stably.

As recited in claim 3 mentioned below, the invention is arranged such that the floor reaction force calculator includes an observer that estimates the floor reaction force by estimating a displacement of the dumper. Since it is arranged such that the floor reaction force calculator includes an observer that estimates the floor reaction force by estimating a displacement of the dumper, the floor reaction force can be calculated more accurately, thereby enabling to control the legged mobile robot to walk more stably.

As recited in claim 4 mentioned below, the invention is arranged such that the floor reaction force calculated by the floor reaction force calculator includes at least a force component acting in a direction of vertical axis. Since it is arranged such that the floor reaction force calculated by the floor reaction force calculator includes at least a force component acting in a direction of vertical axis, it becomes possible to control the legged mobile robot to walk more stably based on the floor reaction force acting in that direction.

As recited in claim 5 mentioned below, the invention is arranged such that a plurality of the displacement sensors are disposed to be apart from each other when viewed from top and the floor reaction force calculator calculates the floor reaction force based on outputs of the displacement sensors. Since it is arranged such that a plurality of the displacement sensors are disposed to be apart from each other when viewed from top and the floor reaction force calculator calculates the floor reaction force based on outputs of the displacement sensors, in addition to the effect mentioned with reference to claim 1, elasticity of the foot can be optimized.

As recited in claim 6 mentioned below, the invention is arranged such that the floor reaction force calculated by the floor reaction force calculator includes a force component acting in a direction of vertical axis and a moment component acting about an axis that orthogonally intersects the vertical axis. Since it is arranged such that the floor reaction force calculated by the floor reaction force calculator includes a force component acting in a direction of vertical axis and a moment component acting about an axis that orthogonally intersects the vertical axis, in addition to the effect mentioned with reference to claim 4, it becomes possible to control the legged mobile robot to walk more stably based on the floor reaction force acting in these directions.

As recited in claim 7 mentioned below, the invention is arranged such that the displacement sensor comprises a spring and a pressure-sensitivity sensor. Since it is arranged such that the displacement sensor comprises a spring and a pressure-sensitivity sensor, in addition to the effect mentioned with reference to claim 1, the sensor structure can be made more compact.

As recited in claim 8 mentioned below, the invention is arranged such that a rigidity of the spring is set lower than that of the elastic member. Since it is arranged such that a rigidity of the spring is set lower than that of the elastic member, in addition to the effect mentioned with reference to claim 1, it becomes to prevent the function of the elastic member to attenuate oscillation from being degraded.

As recited in claim 9 mentioned below, the invention is arranged such that the system further includes; a second floor reaction force detector installed at a position between the second joint and the floor contact end of the foot and generating an output indicating a floor reaction force acting on the foot from the floor surface which the robot contacts. It is thus arranged such that a second floor reaction force detector is installed at a position between the second joint and the floor contact end of the foot and generating an output indicating a floor reaction force acting on the foot from the floor surface which the robot contacts. Therefore, when detecting the floor reaction force acting on the foot by the floor reaction force detector installed at the foot of the legged mobile robot, by disposing the displacement sensor at the foot additionally so as to enable to calculate (or estimate) the floor reaction force, such a combination of different types of sensors can constitute a dual sensory system and hence, the detection accuracy can be enhanced.

As recited in claim 10 mentioned below, the invention is arranged such that the system further includes; a self-diagnoser that self-diagnoses whether abnormality or degradation occurs in at least one of the displacement sensor and the second floor reaction force detector based on the floor reaction force calculated by the floor reaction force calculator and the floor reaction force detected from the output of the second floor reaction force detector. Thus, since it is arranged to have a self-diagnoser that self-diagnoses whether abnormality or degradation occurs in at least one of the displacement sensor and the second floor reaction force detector based on the floor reaction force calculated by the floor reaction force calculator and the floor reaction force detected from the output of the second floor reaction force detector, it becomes possible to further enhance the detection accuracy.

As recited in claim 11 mentioned below, the invention is arranged such that the self-diagnoser includes; a first determiner that determines whether at least one of a difference and a ratio between the floor reaction force calculated by the floor reaction force calculator and the floor reaction force detected from the output of the second floor reaction force detector is within a first predetermined range; and self-diagnoses that at least one of the displacement sensor, the second floor reaction force detector and the elastic member degrades when it is determined that at least one of the difference and the ratio is not within the first determined range. Thus, since it is arranged to determine whether at least one of a difference and a ratio between the floor reaction force calculated by the floor reaction force calculator and the floor reaction force detected from the output of the second floor reaction force detector is within a first predetermined range; and self-diagnose that at least one of the displacement sensor, the second floor reaction force detector and the elastic member degrades when it is determined that at least one of the difference and the ratio is not within the first determined range, it becomes possible to self-diagnose its degradation accurately.

As recited in claim 12 mentioned below, the invention is arranged such that the self-diagnoser includes; a second determiner that determines whether at least one of a difference and a ratio between the floor reaction force calculated by the floor reaction force calculator and the floor reaction force detected from the output of the second floor reaction force detector is within a second predetermined range; and self-diagnoses that the second floor reaction force detector is abnormal when it is determined that at least one of the difference and the ratio is not within the second predetermined range. Thus, since it is arranged to determine whether at least one of a difference and a ratio between the floor reaction force calculated by the floor reaction force calculator and the floor reaction force detected from the output of the second floor reaction force detector is within a second predetermined range; and self-diagnose that the second floor reaction force detector is abnormal when it is determined that at least one of the difference and the ratio is not within the second predetermined range, it becomes possible to self-diagnose an abnormality of the second floor reaction force detector accurately.

As recited in claim 13 mentioned below, the invention is arranged such that the self-diagnoser includes; a counter counting a number of times that at least one of the difference and the ratio is determined to be not within the first predetermined range; and self-diagnoses that at least one of the displacement sensor, the second floor reaction force detector and the elastic member degrades when the counted number of times exceeds a predetermined number of times. Thus, since it is arranged to count a number of times that at least one of the difference and the ratio is determined to be not within the first predetermined range; and self-diagnoses that at least one of the displacement sensor, the floor reaction force detector and the elastic member degrades when the counted number of times exceeds a predetermined number of times, it becomes possible to self-diagnose their degradation accurately.

As recited in claim 14 mentioned below, the invention provides a floor reaction force detection system of a legged mobile robot having at least a body and a plurality of legs each connected to the body through a first joint and each having a foot connected to a distal end of the leg through a second joint, comprising: a displacement sensor installed at a position in or adjacent to an elastic member disposed between the second joint and a floor contact end of the foot, and generating an output indicating a displacement of the floor contact end of the foot relative to the second joint; a floor reaction force detector installed at a position between the second joint and the floor contact end of the foot and generating an output indicating a floor reaction force acting on the foot from the floor surface which the robot contacts; and an adaptive observer that outputs a floor reaction force estimation error indicating a difference between a floor reaction forces estimated from the output of the displacement sensor and the floor reaction force detected from the output of the floor reaction force detector, using a model that describes a relationship between a displacement and a stress generated in the elastic member in response to the displacement of the floor contact end of the foot, and identifying a parameter value of the model. Thus, it is arranged to have a displacement sensor installed at a position in or adjacent to an elastic member disposed between the second joint and a floor contact end of the foot, and generating an output indicating a displacement of the floor contact end of the foot relative to the second joint; a floor reaction force detector installed at a position between the second joint and the floor contact end of the foot and generating an output indicating a floor reaction force acting on the foot from the floor surface which the robot contacts; and an adaptive observer that outputs a floor reaction force estimation error indicating a difference between a floor reaction forces estimated from the output of the displacement sensor and the floor reaction force detected from the output of the floor reaction force detector, using a model that describes a relationship between a displacement and a stress generated in the elastic member in response to the displacement of the floor contact end of the foot, and identifying a parameter value of the model. Thus, in addition to the floor reaction force detector installed at the foot to detect the floor reaction force acting on the foot, when the displacement sensor is additionally installed such that the floor reaction force is calculated or estimated, it can estimate the change of the viscoelastic characteristic due to temperature drift or degradation of the elastic member without needing a temperature sensor, thereby enabling to further enhance the detection accuracy.

As recited in claim 15 mentioned below, the invention is arranged such that the system further includes; an elastic member self-diagnoser that self-diagnoses degradation of the elastic members based on at least the parameter value. Since it is arranged to self-diagnose degradation of the elastic members based on at least the parameter value, it becomes possible to further enhance the detection accuracy.

As recited in claim 16 mentioned below, the invention is arranged such that the adaptive observer is separately installed for each foot. Since it is arranged to install the adaptive observer separately for each foot, it becomes possible to further enhance the detection accuracy for each foot.

As recited in claim 17 mentioned below, the invention is arranged such that the adaptive observer is installed for the feet. Since it is arranged to install the adaptive observer for the foot, it becomes possible to further enhance the detection accuracy for each foot with a simple structure.

As recited in claim 18 mentioned below, the invention is arranged such that the parameter value is used in the adaptive observers in common. Since it is arranged to use the parameter value in the adaptive observers in common, it becomes possible to prevent the walking from falling unstable due to a difference in the parameter value.

As recited in claim 19 mentioned below, the invention is arranged such that the system further includes; a floor reaction force detector self-diagnoser that self-diagnoses an abnormality of the floor reaction force detector based on the floor reaction force estimation errors. Since it is arranged to self-diagnose an abnormality of the floor reaction force detector based on the floor reaction force estimation errors, it becomes possible to further enhance the detection accuracy.

As recited in claim 20 mentioned below, the invention is arranged such that the model is a model in which a viscoelastic characteristic of the elastic member is approximated by a spring and a dumper, and the parameter value is made of a constant of the spring and the dumper. Since it is arranged such that the model is a model in which a viscoelastic characteristic of the elastic member is approximated by a spring and a dumper, and the parameter value is made of a constant of the spring and the dumper, it becomes possible to estimate the change of the viscoelastic characteristic due to temperature drift or degradation more accurately.

BRIEF DESCRIPTION OF THE DRAWINGS

FIG. 7 is a schematic view of the foot illustrated in FIG. 2, explaining the floor reaction force estimation based on an output of the displacement sensor in the operation of the legged mobile robot and the floor reaction force detection system thereof according to the third embodiment;

FIG. 8 is a block diagram showing input/output relation of a spring mechanism model used for the floor reaction force estimation based on an output of the displacement sensor in the operation of the legged mobile robot and the floor reaction force detection system thereof according to the third embodiment;

DETAILED DESCRIPTION OF THE PREFERRED EMBODIMENTS

A legged mobile robot and a floor reaction force detection system thereof according to the embodiments will be explained with reference to the accompanied drawings.

Figure 1:
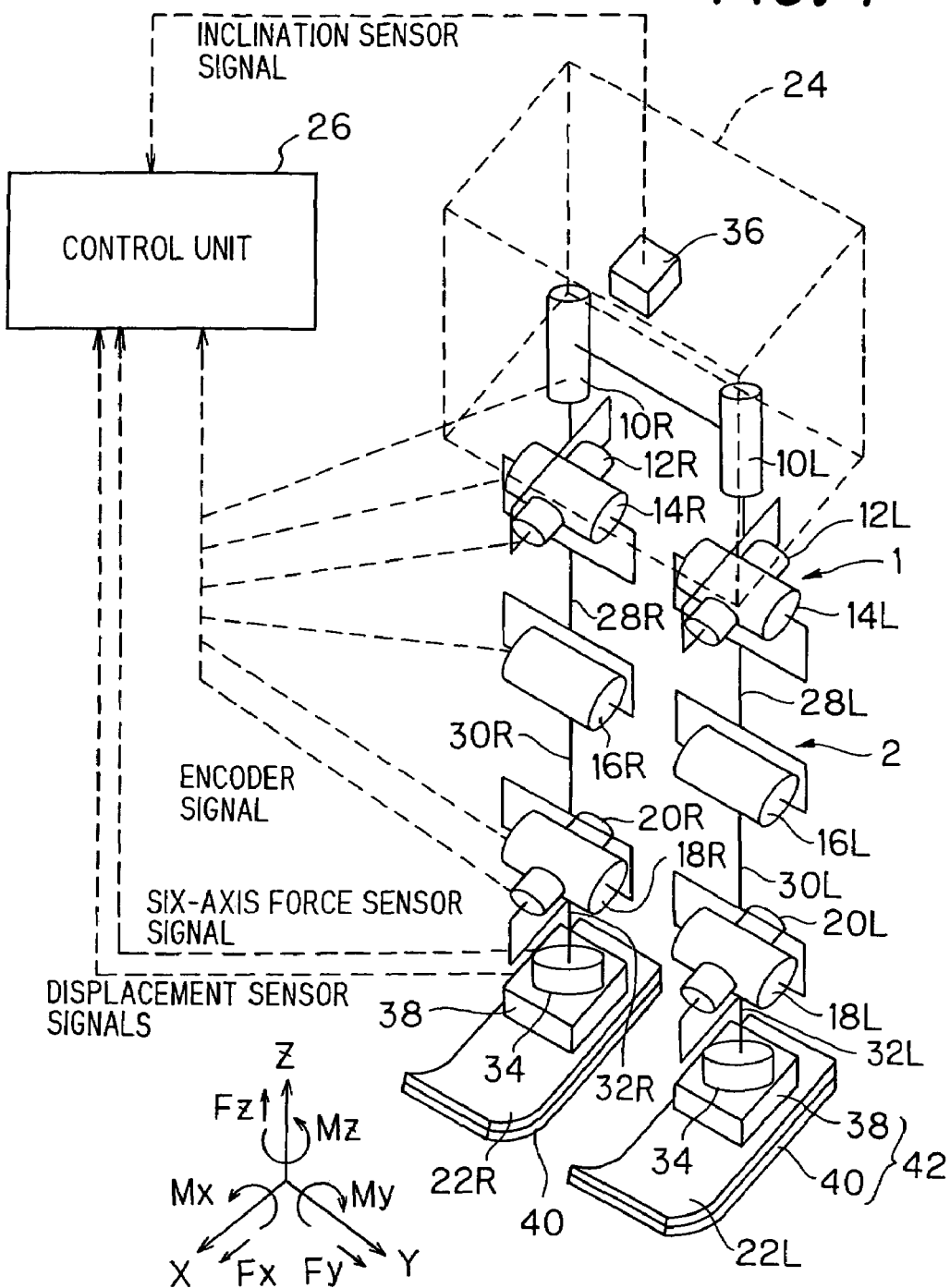
FIG. 1 is an explanatory perspective view showing an overall configuration of a legged mobile robot and a floor reaction force detection system thereof according to an embodiment of the invention.

FIG. 1 is an overall schematic view showing a floor reaction force detector of a legged mobile robot, more specifically a biped robot of humanoid type according to the first embodiment of the invention.

As illustrated in the figure, a biped robot of humanoid type (legged mobile robot; hereinafter simply referred to "robot") 1 has a pair of right and left legs (leg links) 2 each composed of six joints. The six joints include, arranged successively downward, a pair of hip joints 10R, 10L (the right-hand joint is indicated by R and the left-hand joint by L; hereinafter the same) for rotating legs with respect to crotch (hips; about a Z-axis), a pair of hip joints 12R, 12L in the rolling axis (about an X-axis), a pair of hip joints 14R, 14L in the pitching axis (about a Y-axis), a pair of knee joints 16R, 16L in the pitching axis, a pair of ankle joints 18R, 18L in the pitching axis, and a pair of joints 20R, 20L in the rolling axis.

The robot is provided with feet 22R, 22L underneath of the joints 18R(L) and 20R(L), and a body (trunk) 24 at its top which accommodates a control unit 26 and a battery (not shown). The control unit 26 comprises a microcomputer including CPU, ROM, RAM, etc., and is equipped with a warning light (not shown) informing abnormality or degradation occurred at sensor system or the like in the robot 1 and a displaying device (not shown) displaying the fact of abnormality or degradation. A part of the RAM in the control unit 26 is equipped with a backup part comprising a nonvolatile memory which keeps a partial memory value even after stop of power supply from the battery.

In the above, the joints 10R(L), 12R(L), 14R(L) make up the hip joints (or waist joints; the aforesaid first joint), and the joints 18R(L), 20R(L) make up the foot joints (ankle joints; the aforesaid second joint). The hip joints and knee joints (16R(L)) are connected to each other by thigh links 28R, 28L, and the knee joints and ankle joints are connected to each other by crus or shank links 30R, 30L. The ankle joints and feet 22 R(L) are connected to each other by end-side links 32R, 32L.

As shown in the figure, a known six-axis force sensor (floor reaction force detector) 34 is disposed at a position between each ankle joint 18R(L), 20R(L) and a floor contact end of each foot 22R(L), and measures three directional components Fx, Fy, Fz of force and three directional components Mx, My, Mz of moment of the force and detects the presence or absence of foot landing (floor contact) and the floor reaction force (floor contact load) acting from a floor surface (not shown). Moreover, the body 24 has an inclination sensor 36 which detects the inclination and its angular velocity with respect to the Z-axis (the vertical direction (the direction of gravity)). Electric motors of the respective joints are coupled with respective rotary encoders (not shown) that detect the rotation amounts of the electric motors.

Outputs generated by these sensors including the six-axis force sensor 34 are inputted to the control unit 26. The control unit 26 is activated by the onboard battery and calculates a joint displacement operation amount based on data stored in the ROM and the inputted detected values and moves the aforesaid drive joints. With the above structure, each of the legs 2 is given six degrees of freedom. When the 6×2=12 joints are driven to suitable angles during walking, a desired motion is imparted to the entire leg structure to enable the robot to walk arbitrarily in an environment of three-dimensional (absolute) space.

The control unit 26, in accordance with algorithm stored in the ROM, determines a compensating floor reaction force (specifically, moment) in response to the inclination detected by the inclination sensor 36, as proposed in Japanese Laid-Open Patent Application No. Hei 10(1998)-277969. With this, a composite compliance control is carried out such that the detected total floor reaction force becomes equal to a resultant of the compensating floor reaction force and a desired total floor reaction force. At the same time, as proposed in Japanese Laid-Open Patent Application No. 2001-322076, the control unit 26 estimates the shape of a floor surface (which the robot contacts) based on a control deviation of the compensating total floor reaction force. Here, the "total floor reaction force" means a total value of floor reaction forces which acts on the feet 22R(L).

A spring mechanism 38 (explained later) is installed at a position between the six-axis force sensor 34 and the floor contact end of each foot 22R(L), whilst a sole member 40 is attached to the sole of each foot 22R(L). The spring mechanism 38 constitutes a compliance mechanism 42 together with the sole member 40. When the floor reaction force acts on each foot 22R(L), the spring mechanism 38 and the sole member 40 of the compliance mechanism 42 deform or bend to displace the foot 22R(L), thereby absorbing or mitigating impact at foot landing.

The structure of the foot 22R(L), more specifically the structure of the six-axis force sensor 34 and other components thereabout will be explained in detail with reference to FIG. 2.

Figure 2:
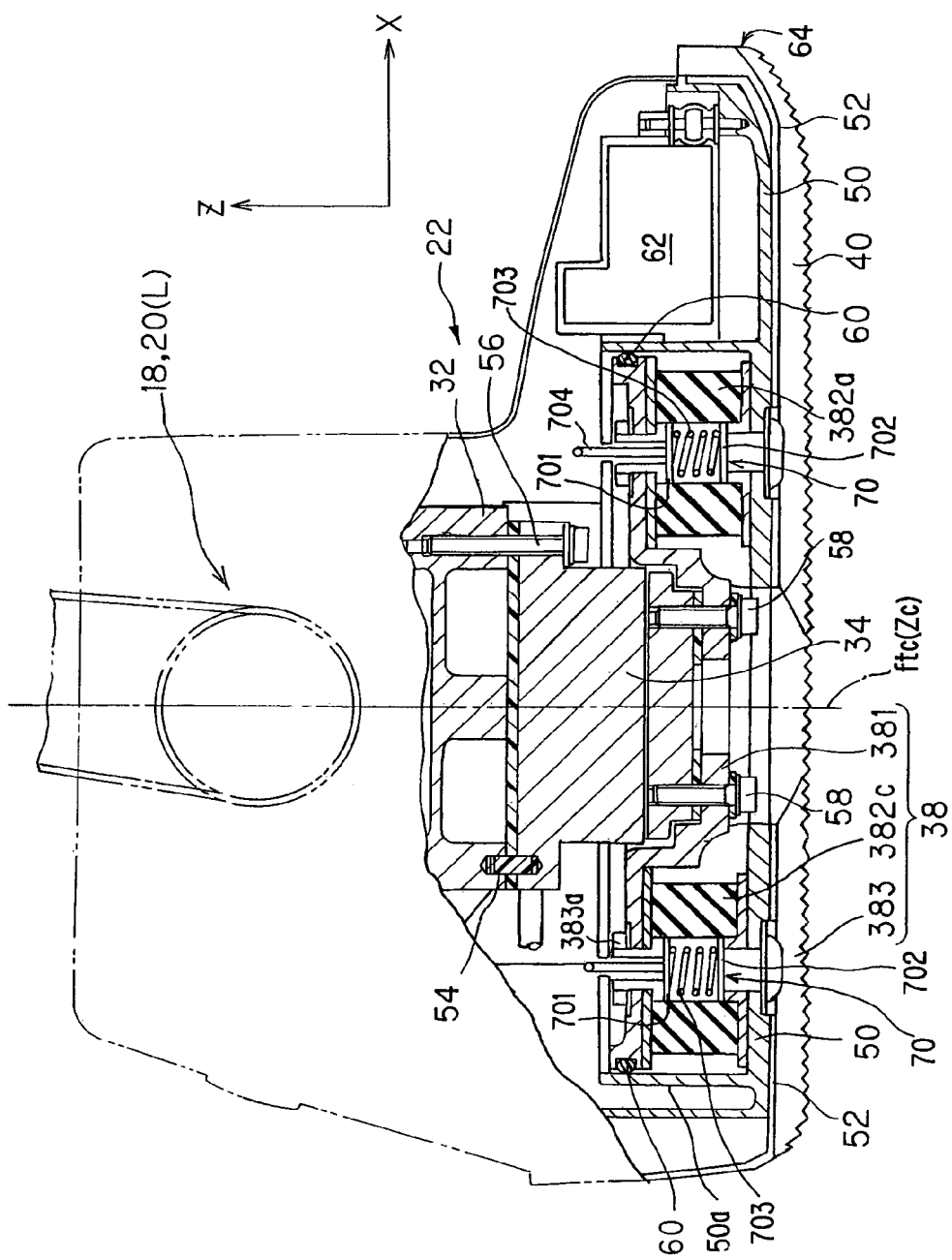
FIG. 2 is a cross-sectional side view showing the structure of a foot of the legged mobile robot illustrated in FIG. 1.
Figure 3:
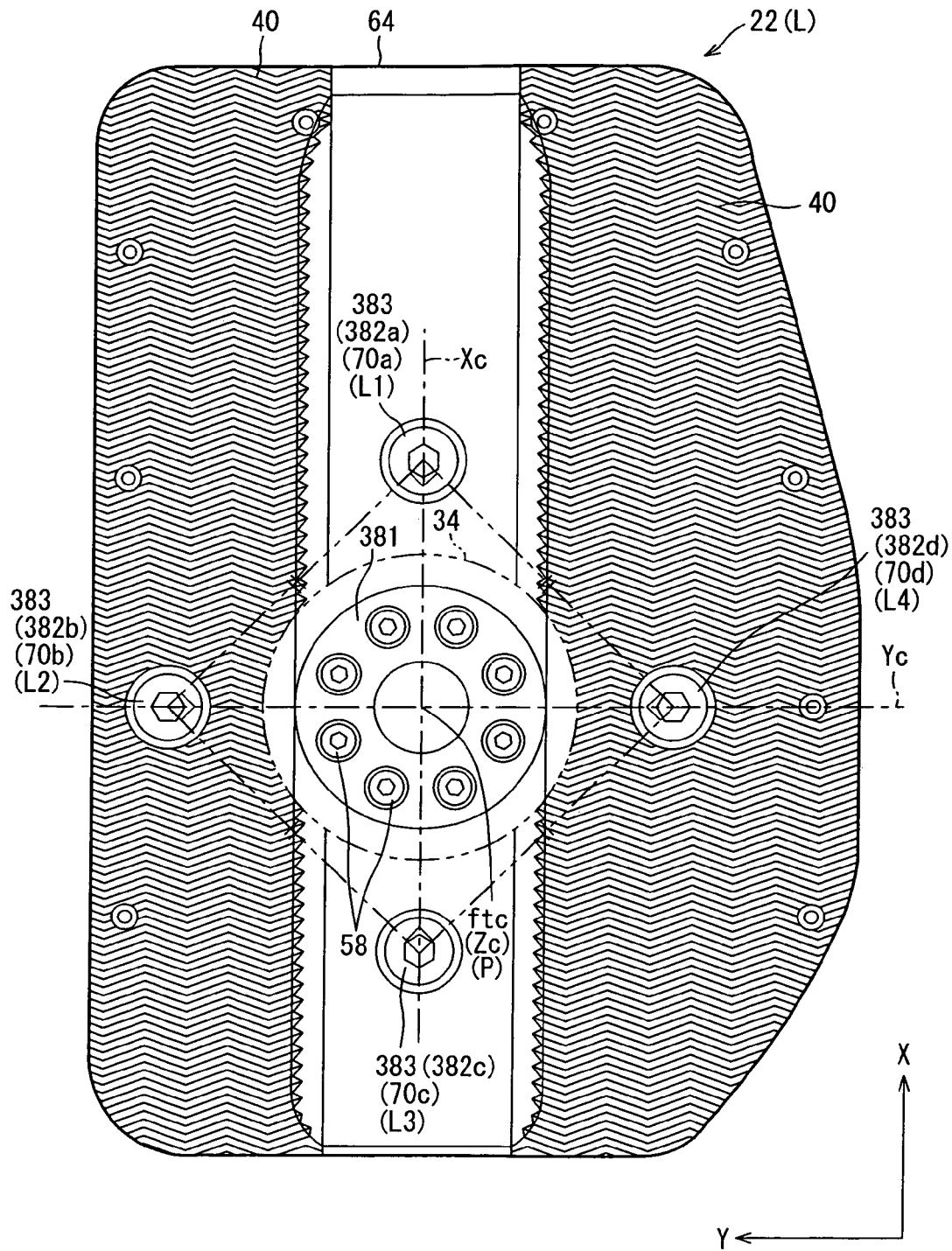
FIG. 3 is a bottom view showing the foot illustrated in FIG. 2.

FIG. 2 is an enlarged cross-sectional side view showing the structure of the left foot 22L (of the feet 22R, 22L) and FIG. 3 is a bottom view showing the left foot viewed from its sole. Since the feet 22R, 22L are symmetrical with each other, the description to the right foot 22R is omitted and the addition of R and L is omitted in the following explanation unless it is needed.

As shown in FIG. 2, the six-axis force sensor 34 is fastened at a position between the ankle joint 18, 20 and the floor contact end of the foot 22, more precisely at a position between the ankle joint 18, 20 and the floor contact end that comprises the spring mechanism 38, a sole frame (second rigid member) 50, a sole plate 52 and the sole member 40. The spring mechanism 38 comprises an inverted-Ω-like frame (first rigid member) 381, cylindrical rubber members (elastic members) 382 and bolts 383. The six-axis force sensor 34 is fastened, at its upper portion, to the end-side link 32 at a location near the ankle joint 18, 20 by a plurality of upper portion fastening bolts 56, while being guided to that location by a gauge pin 54. The end-side link 32 is made of metal (or alloy) such as titanium or magnesium alloy having high rigidity.

The six-axis force sensor 34 is connected, at its lower portion, to the sole frame 50 through the spring mechanism 38. A rib is integrally raised at the upper surface of the sole frame 50 toward the ankle joint 18, 20 to constitute a guide portion 50a that accommodates the inverted-Ω-like frame 381 connected to the ankle joint 18, 20 so as to prevent the supporting leg from twisting about the vertical axis, as mentioned above. The sole frame 50 is made of metal having high rigidity.

The inverted-Ω-like frame 381 constituting the spring mechanism 38 is also made of aluminum (or its alloy). The frame 381 has a recess at its middle and the six-axis force sensor 34 is fastened to the inverted-Ω-like frame 38i by the eight bolts 58 with its lower portion being inserted in the recess.

A ring-like member 60 (made of lubricative material) is interposed between the inverted-Ω-like frame 381 and the sole frame 50. The ring-like member 60 acts like a piston ring when the inverted-Ω-like frame 381 moves up and down inside a guide part 50a of the sole frame 50.

Thus, the cylindrical rubber members 382 are disposed between the ankle joint (second joint) 18, 20 and the floor contact end of the foot 22, more precisely, in the space formed between the inverted-Ω-like frame (first rigid member) 381 connected to the ankle joint 18, 20 and the sole frame (second rigid member) 50 connected to the floor contact end of the foot 22. A plural number of the cylindrical rubber members 382 are locally disposed or located apart from each other when viewed from top.

As shown in FIG. 3, the cylindrical rubber members 382 (382a, 382b, 382c, 382d) in four are arranged to be apart the same distance with each other near the edge of the foot 22. Although FIG. 3 is the bottom view, since it is symmetrical, the allocation is almost same even when viewed from top. The cylindrical rubber members 382 are made of synthetic rubber and have excellent elasticity.

The inverted-Ω-like frame 381 and the sole frame 50, defining the space where the cylindrical rubber members 382 is housed, are fastened by the bolts 383 (and nuts 383a) used for the spring mechanism, while sandwiching the cylindrical rubber members 382 therebetween. As shown in FIG. 2, an airtight space is formed in each of the cylindrical rubber members 382, in which displacement sensors 70 are accommodated (housed).

Figure 4:
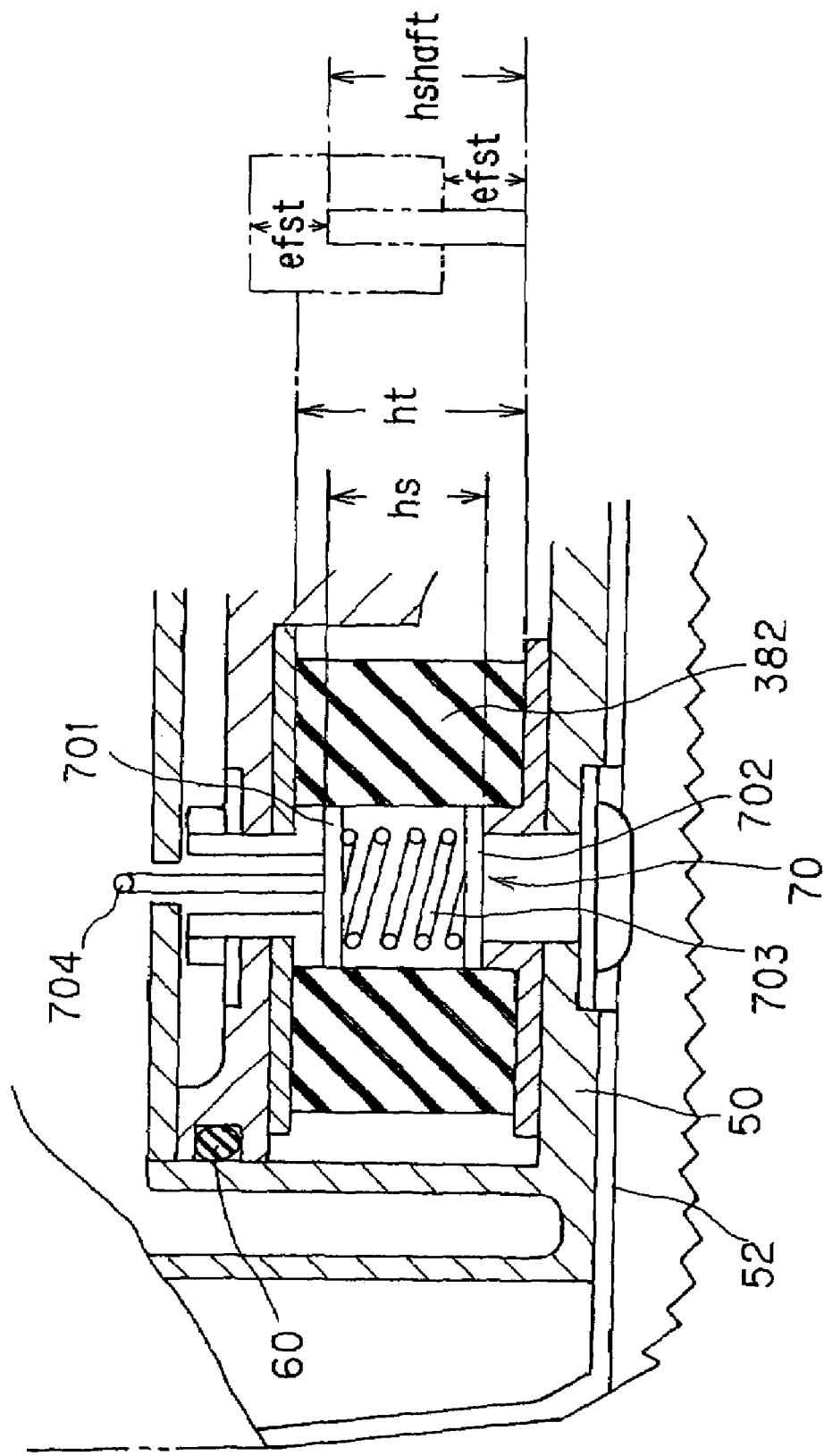
FIG. 4 is an enlarged partial cross-sectional view showing a portion of the foot illustrated in FIG. 2.

FIG. 4 is an enlarged explanatory view showing a portion accommodating the displacement sensors illustrated in FIG. 2. As shown in the figure, each of the displacement sensors 70 comprises an electrostatic type pressure-sensitivity sensor 701 having a plate-like shape, a plate member 702 disposed facing thereto, and a coil spring 703 disposed between the pressure-sensitivity sensor 701 and plate member 702 to bias or urge the pressure-sensitivity sensor 701. A sensing element and a converter (neither shown) are integrally housed in the pressure-sensitivity sensor 701. Outputs of the converter is taken from a harness 704 and sent to the control unit 26.

As well-shown in FIG. 4, when defining top-to-bottom height (natural height) of the cylindrical rubber members 382 as "ht", that of the displacement sensors is made smaller or shorter than "ht" and set as "hs" such that the displacement sensors 70 are accommodated in the space defined by "ht" indicating the top-to-bottom height of the cylindrical rubber members 382.

In the displacement sensors 70, when the cylindrical rubber members 382 contract in response to load in a compressive direction due to landing of the foot 22 or the like, the spring 703 also contracts accordingly. The pressure-sensitivity sensor 701 detects the stress exerted on the spring 703 and senses the spring length (displacement of cylindrical rubber members 382). In other words, it is configured such that the pressure-sensitivity sensor 701 senses the stress due to expansion and contraction of the spring 703 as a pressure value and converts it to the displacement of the spring 703.

Then, as described below, the stress in the cylindrical rubber members 382 generated in response to the displacement of the spring 703, i.e., the floor reaction force acting on the foot 22 from a floor surface which the robot 1 contacts, is calculated based on the outputs of the displacement sensors 70, by using a model describing the stress based on the viscoelastic characteristic of the cylindrical rubber members 382.

In this manner, the displacement sensors 70 comprise the pressure-sensitivity sensor 701, spring 703, etc., and is configured to generate the outputs indicating the displacement (moving distance) of the floor contact end of the foot 22 relative to the ankle joint 18, 20, i.e., the displacement (moving distance) between the inverted-106-like frame 381 and the sole frame 50 and based on the outputs, to detect the floor reaction force (load) acting on the foot 22.

Here, rigidity of the spring 703 should be set sufficiently lower than that of the cylindrical rubber members 382, so as to prevent the effect to attenuate oscillation by the viscosity of the cylindrical rubber members 382 from being degraded.

Explaining the detection axis of the six-axis force sensor 34, etc., with reference to FIG. 3, the sole (foot sole surface) of the foot 22 has an almost rectangular shape and the six-axis force sensor 34 is installed at a position slightly rearward from the center in the front-and-back direction (in the direction of the X-axis). In the figure, "Xc" indicates the detection axis of the six-axis force sensor 34 in the direction of the X-axis and "Yc" indicates that in the direction of the Y-axis. These detection axes Xc and Yc orthogonally intersect the leg center line "ftc" in the direction of a Z-axis (as is best shown in FIG. 2). Thus, the six-axis force sensor 34 is installed in such a manner that the detection axis Zc is made equal to the leg center line ftc.

It should be noted in the above that the front-and-back direction (the X-axis direction) is a direction in which the robot 1 advances, as will be understood from FIG. 1. The right-and-left (sidewise) direction is the Y-axis direction that orthogonally intersects the X-axis direction (advancing direction) and the Z-axis direction (direction of gravity or vertical-axis).

The six-axis force sensor 34 is installed in such a manner that the detection axis Zc thereof is positioned at the center of each pair of the cylindrical rubber members 382 (382*a* and 382*c*, or 382*b* and 382*d*; indicated by the bolts 383 also hidden behind the sole).

Specifically, the sensor 34 is installed in such a manner that the detection axis Zc thereof is positioned at the center of the two members 382*a* and 382*c* located in the advancing direction (X-axis direction), i.e., the detection axis Xc, and at the center of the two members 382*b* and 382*d* in the right-and-left direction (Y-axis direction), i.e., the detection axis Yc. Thus, the sensor 34 is installed in such a manner that its detection axis Zc is positioned at the center of gravity or center of mass of a rectangle (more precisely a square with four equal sides) formed by the four cylindrical rubber members 382 (382*a*, 382*b*, 382*c*, 382*d*).

In FIG. 2, reference numeral 62 indicates an amplifier of the displacement sensor 70 and reference numeral 64 a toe of the foot 22.

The legged mobile robot according to this embodiment is configured such that, as mentioned above, the four displacement sensors 70 made of the sensing element and converter are locally installed (accommodated) in the space defined by "ht" which is designated as the top-to-bottom height of the cylindrical rubber members 382, in top view. With that, since the displacement sensors 70 are configured such that the displacement of the floor contact end of the foot 22 can be detected, it is possible to make the displacement sensors 70, including the converter, compact enough to be installed in the limited space of the cylindrical rubber members 382 at the foot 22 of the robot 1.

Further, the displacement sensors 70 are housed inside the airtight spaces of the cylindrical rubber members 382, whilst each of the four cylindrical rubber members 382 is installed locally between the ankle joint 18, 20 and floor contact end of the foot 22 in top view, more precisely near the edge of the foot 22, thereby optimizing elasticity of the foot 22. The foot 22 of the robot 1 shown in the figure should preferably have appropriate elasticity for both of the bending (rotational) direction and up-and-down direction. However, if the cylindrical rubber members 382 are unevenly gathered about the center of the foot and if their elasticity coefficient is set so that the bending elasticity is appropriate, the elasticity in the up-and-down direction might occasionally become hard excessively, for instance. In that case, the requirements contradict and it becomes difficult to satisfy both of the requirements. In this embodiment, however, the contradicted requirements can be achieved by the above-mentioned configuration.

Further, it is configured such that the displacement sensors 70 are housed in the airtight space (chamber), i.e., is sealed in the space. It makes possible to prevent the displacement sensors 70 from adhering or intruding of foreign substances such as liquid or dust, thereby enabling to enhance the durability of the displacement sensors 70. Moreover, as receiving less influence from the ambient temperature, it can decrease the necessity of correction, e.g., temperature compensation.

Furthermore, it is configured such that the displacement sensors 70 comprise the spring 703 and the pressure-sensitivity sensor 701, thereby achieving to make the structure of the sensors more compact compared to the case of detecting from the normal displacement (stroke).

Specifically, a normal stroke sensor needs thickness (height) adding a movable space equal to or greater than a usable stroke efst which can be actually measured, to the length of a shaft hshaft, as drawn in dashed line in FIG. 4. Accordingly, even if the length of the shaft hshaft is set to equal to the usable stroke efst (i.e., whole length of the shaft is effective as the usable stroke), a value of 2×efst is still needed for the thickness of the stroke sensor at the minimum.

Therefore, if the cylindrical rubber members 382 contracts at or below the half of the natural length ht (i.e., efst needs the length equal to or more than ht/2), the stroke sensor cannot be installed inside the space defined by the top-to-bottom height of the cylindrical rubber members 382. Since the whole length of the shaft can be hardly used as the usable stroke actually, the thickness of the stroke sensor tends to be equal to or more than 2×efst and the trouble will become more apparent. Contrary, in the displacement sensors 70 according to this embodiment, the elasticity of the spring 703 and sensitivity of the pressure-sensitivity sensor 701 are appropriately set, thereby achieving "hs" less than "ht" which is the natural length of the cylindrical rubber members 382.

Further, it is configured such that rigidity of the spring 703 is lower than that of the cylindrical rubber members 382. Accordingly it can avoid degradation of the effect to attenuate oscillation of the cylindrical rubber members 382.

Figure 5:
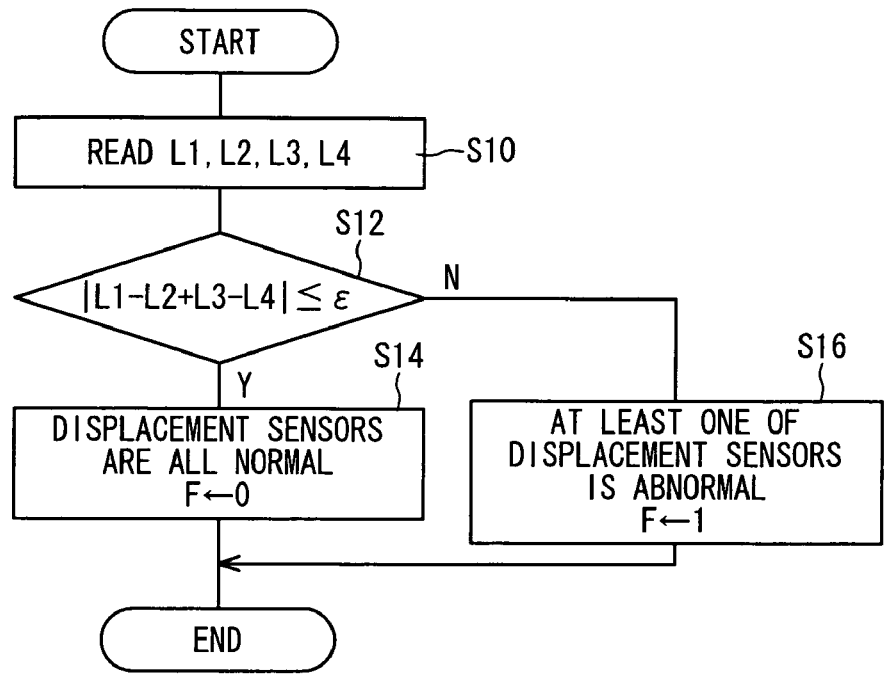
FIG. 5 is a flow chart showing the operation of detecting abnormality or malfunction (i.e., self-diagnosing) of a displacement sensor illustrated in FIG. 2, in the operation of the legged mobile robot and the floor reaction force detection system thereof, according to a second embodiment of the invention.

FIG. 5 is a flow chart showing the operation of detecting abnormality (i.e., self-diagnosing) of a displacement sensor illustrated in FIG. 2, in the operation of the legged mobile robot and the floor reaction force detection system thereof, according to a second embodiment of the invention;

In the second embodiment, it is configured to self-diagnose abnormality occurred in the displacement sensors 70 installed at the foot 22 of the legged mobile robot explained in the first embodiment. Since the four displacement sensors 70 are installed, their redundancy is used to detect abnormality (self-diagnose) of the displacement sensors 70 in the second embodiment.

The second embodiment will be explained.

In FIG. 3, when defining outputs (which indicate the displacement or a contraction amount of the cylindrical rubber member 382) of the displacement sensors 70a, 70b, 70c, 70d installed in each of the cylindrical rubber member 382a, 382b, 382c, 382d, as L1, L2, L3 and L4, if the four displacement sensors 70 are normal, Eq. 1 is always satisfied from a geometrical relationship. Here, the sensor outputs are assumed to have no offsets.

$$L1+L3-L2-L4=0 \qquad \text{Eq. 1}$$

FIG. 5 is the flow chart showing the operation of detecting abnormality (self-diagnosing) occurred in the displacement sensors 70 based on Eq. 1.

The program is activated at the control unit 26 in every control cycle, e.g., in every 10 msec for each of the right and left legs (leg 2).

The program begins at S10 in which detected values Ln of the four displacement sensors 70 are read, and proceeds to S12 in which it is determined whether the absolute value in the left side of Eq. 1 is equal to or less than a permissible value (predetermined value) $\epsilon$. The value is positive and close to 0, or a value close thereto. If the left side of Eq. 1 is not to be the absolute value, it is a value close to 0. In other words, it is determined whether the detected values Ln approximately satisfy Eq. 1. When it is to be determined more strictly whether the detected values Ln satisfy Eq. 1, it suffices if the permissible value $\epsilon$ is set to 0 and the inequality sign is changed to the equality sign. If there are offsets at the located position of the displacement sensors 70, the left side of Eq. 1 should be L1+L3−L2−L4+C (C: predetermined value) or it should be determined at S12 whether the difference between L1+L3 and L2+L4 is equal or almost equal to a predetermined difference.

When the result at S12 is affirmative, the program proceeds to S14 in which it is determined that the four displacement sensors 70 are all normal and the bit of a flag F is reset to 0. On the other hand, when the result at S12 is negative, the program proceeds to S16 in which it is determined that abnormality such as wire disconnection has occurred in all or at least one of the four displacement sensors 70 and the bit of the flag F is set to 1. At the same time, a warning light is lit and the display device is made on. The warning lights can be increased in line with to detection objects such as one that should be lit when the displacement sensors 70 is determined to be abnormal, one that should be lit when at least one of the displacement sensors 70, six-axis force sensor 34 and cylindrical rubber members 382 is determined to be degraded (explained below), and the rest that should be lit when the six-axis force sensor 34 is determined to be abnormal (explained below).

Thus, this embodiment is configured to have comprise the four (a plurality of) displacement sensors 70 installed in the space formed between the inverted-Ω-like frame (first rigid member) 381 connected to the ankle joint 18, 20 and the sole frame (second rigid member) 50 connected to the floor contact end of the foot 22, located apart from each other near the edge of the foot 22 in top view, that generates the outputs indicating the displacement h (Ln) of the floor contact end of foot 22 relative to the ankle joint 18, 20, and the self-diagnoser that determines whether the outputs Ln from the displacement sensors 70 satisfy the predetermined geometric relationship and self-diagnoses whether abnormality has occurred in at least one of the four displacement sensors 70 based on a determined result.

In other words, it is configured to self-diagnose whether the displacement sensors 70 are abnormal based on the determined result whether the sensor outputs Ln approximately (or accurately) satisfy Eq. 1, by utilizing the redundancy of location or allocation of the four displacement sensors 70, i.e., the geometric relationship of sensor location. Accordingly, even though the displacement sensors 70 are disposed at the foot 22 of the robot 1 to suffer from the impact at foot landing, the detection accuracy can be improved.

Further, it is configured such that the geometric relationship is such that the difference between outputs of displacement sensors located at opposite positions is less than the permissible value $\epsilon$ (specifically, 0 or a value close thereto, more specifically, a value close to 0). Therefore, it can easily and promptly self-diagnose whether the displacement sensors 70 are abnormal, thereby enhancing the detection accuracy. The rest of the structure and effect is the same as that of the first embodiment.

Figure 6:
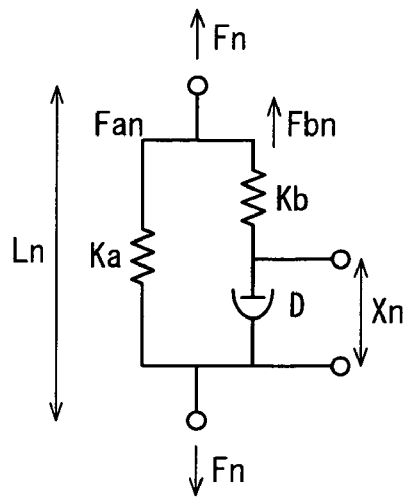
FIG. 6 is an explanatory view showing a model approximating a characteristic of a cylindrical rubber member (elastic member), used for floor reaction force estimation by the displacement sensor illustrated in FIG. 2, in the operation of the legged mobile robot and the floor reaction force detection system thereof according to a third embodiment of the invention.

FIG. 6 is an explanatory view showing a model approximating a characteristic of a cylindrical rubber member (elastic member) in the operation of the legged mobile robot and the floor reaction force detection system thereof according to a third embodiment of the invention.

In order to control the robot 1 to walk more stably, it is preferable to detect not only the displacement of the foot 22 but also the floor reaction force acting on the foot 22. When the six-axis force sensor (floor reaction force detector) 34 is installed at each foot 22 to detect the floor reaction force acting on the foot 22, if the displacement sensors 70 is additionally used such that the floor reaction force is calculated or estimated based on the outputs of the displacement sensors 70, a dual sensory system can be constituted by combining such different types of detectors, thereby enabling to enhance the detection accuracy.

Further, the six-axis force sensor or the like is liable to suffer from the impact at foot landing as mentioned above. In order to improve the detection accuracy, it is preferable to self-diagnose degradation or abnormality of the six-axis force sensor 34, etc., based on the outputs of the displacement sensors 70.

In the third embodiment, it is configured, therefore, to self-diagnose degradation or abnormality of the six-axis force sensor 34, etc., based on the outputs of the displacement sensors 70, while calculating (estimating) the floor reaction force acting on the foot 22 from the floor surface based on the outputs of the displacement sensors 70.

This will be explained. The operation thereof is also carried out in the control unit 26.

The characteristic of the cylindrical rubber members 382 installed at the right and left feet 22 (the aforesaid stress characteristic) is approximated by a viscoelastic model comprising a spring (first spring) having a spring constant Kb, a (virtual) dumper having a dumping constant D arranged in series therewith, and another spring (second spring) having spring constant Ka arranged in parallel therewith. The characteristic is expressed as follows:

$$Fn=-Ka \times Ln - Kb \times (Ln-Xn) + C \ D \times d(Xn)/dt = Kb \times (Ln-Xn) \qquad \text{Eq. 2}$$

Here, except for Ln mentioned above, Fn: stress generated in the cylindrical rubber members 382, Xn: contraction amount (displacing amount) of the (virtual) dumper in the viscoelastic model, d (Xn)/dt: time derivative value of Xn, Ka and Kb: spring constants, D: dumping constant and C: constant indicating offsets. "n" indicates one of the four cylindrical rubber members 382a to 382d, specifically, n=1: 382a, n=2: 382b, n=3: 382c, n=4: 382d.

The characteristic can be approximated taking nonlinearity of the cylindrical rubber members 382 into account, as follows:

$$Fn=-f1(Ln)-f2(Ln-Xn)+C\,D\times d(Xn)/dt=f2\times(Ln-Xn) \quad \text{Eq. 2-1}$$

Here, f1 and f2 are functions increasing monotonically relative to the inputs.

FIG. 7 is a schematic view of the foot 22. In the third embodiment, the floor reaction force acting on the foot 22 is expressed by the center point in the X and Y directions of the location of the four displacement sensors 70 as a point of action, for the ease of understanding. Precisely, a middle point P of the height (natural length) of the cylindrical rubber members 382 indicates the point of action. In the figure, the end-side link 32 is omitted.

A translational element of the floor reaction force detected by the six-axis force sensor 34 is indicated by a vector Ffs, and force components in the X, Y and Z directions respectively Ffsx, Ffsy and Ffsz. A moment components about these axes are indicated by a vector Mfs and X, Y and Z-axis directional components respectively Mfsx, Mfsy and Mfsz.

Similarly, a vector Ffbz indicates a Z-axis directional component of the translational element of the floor reaction force estimated from the detected value of the four displacement sensors 70 and Mfbx and Mfby respectively X- and Y-axis directional elements of the moment components. The above yields Eq. 3 as follows:

$$Ffbz=F1+F2+F3+F4 \quad \text{Eq. 3a}$$

$$Mfbx=\{(F2-F4)\times d1\}/2 \quad \text{Eq. 3b}$$

$$Mfby=\{(-F1+F3)\times d2\}/2 \quad \text{Eq. 3c}$$

Since the viscoelastic characteristic of the cylindrical rubber members 382 is assumed to be known, Eqs. 2 (or 2-1) and 3a to 3c are established. Thus, the three (axial force) components of the floor reaction force can be accurately calculated (estimated) based on the outputs of the displacement sensors 70 (the other components cannot be detected from the principle). In the above, d1: distance between the displacement sensors 70$b$ and 70$d$ and d2: distance between the displacement sensors 70$a$ and 70$c$.

Assuming the relative height relative to the sole frame 50 of the inverted-Ω-like frame 381 supporting the cylindrical rubber members 382 (displacement of the contact end of the foot 22 relative to the ankle joint 18, 20) as h, the relative inclination about the X-axis as θx (not shown), and the relative inclination about the Y-axis as θy. L1, L2, L3, L4 and the relationship among them can be expressed as follows:

$$h=(L1+L2+L3+L4)/4 \quad \text{Eq. 4a}$$

$$\theta x=(L2-L4)/d1 \quad \text{Eq. 4b}$$

$$\theta y=(L3-L1)/d2 \quad \text{Eq. 4c}$$

Instead of Eq. 4a, it is possible to use one of the following equations 4a-1 or 4a-2. However, the above equation is better when taking measurement errors into account.

$$h=(L1+L3)/2 \quad \text{Eq. 4a-1}$$

$$h=(L2+L4)/2 \quad \text{Eq. 4a-2}$$

The floor reaction force is estimated using an observer 90 illustrated in FIG. 8($a$). The observer 90 has a model (spring mechanism model) designed based on Eqs. 1, 2 (2-1), 3a, 3b, 3c, 4a, 4b, 4c, that inputs h, θx, θy and outputs Ffbz, Mfbx, Mfby (whose quantity of stated is defined as Xn). The observer 90 estimates Ffbz, Mfbx, Mfby from L1, L2, L3, L4 based on the relationships mentioned above in a manner mentioned below.

First, the quantity of state Xn of the illustrated model is initialized. This is done by making it equal to a theoretical value of the displacement sensor's detected value when the floor reaction force is not acting on the foot 22, or making it equal to the theoretical value of the sensor's detected value when the robot 1 is in an upright position such that the floor reaction force acts on the feet 22. Specifically, the theoretical value should be determined based on an assumed value of floor reaction force acting on the foot 22 of the robot 1 when the initialization is carried out. Since the quantity of state Xn has convergence, even if the initialized value variants, it does not cause a problem.

Next, the displacement sensor detected values L1, L2, L3, L4 are substituted to Eqs 4a, 4b and 4c to calculate h, θx, θy. Then, Ffbz, Mfbx, Mfby are calculated for each leg 2 by using the model illustrated in the figure.

Then errors Fferrz, Mferrx, Mferry between the calculated Ffbz, Mfbx, Mfby and Ffsz, Mfsx, Mfsy (corresponding thereto) of the floor reaction force components detected by the six-axis force sensor 34 are determined as follows:

$$Fferrz=Ffsz-Ffbz$$

$$Mferrx=Mfsx-Mfbx$$

$$Mferry=Mfsy-Mfby \quad \text{Eq. 5}$$

It becomes possible to discriminate or self-diagnose whether the six-axis force sensor 34 is abnormal by determining whether the errors calculated as mentioned are within permissible ranges.

Figure 9:
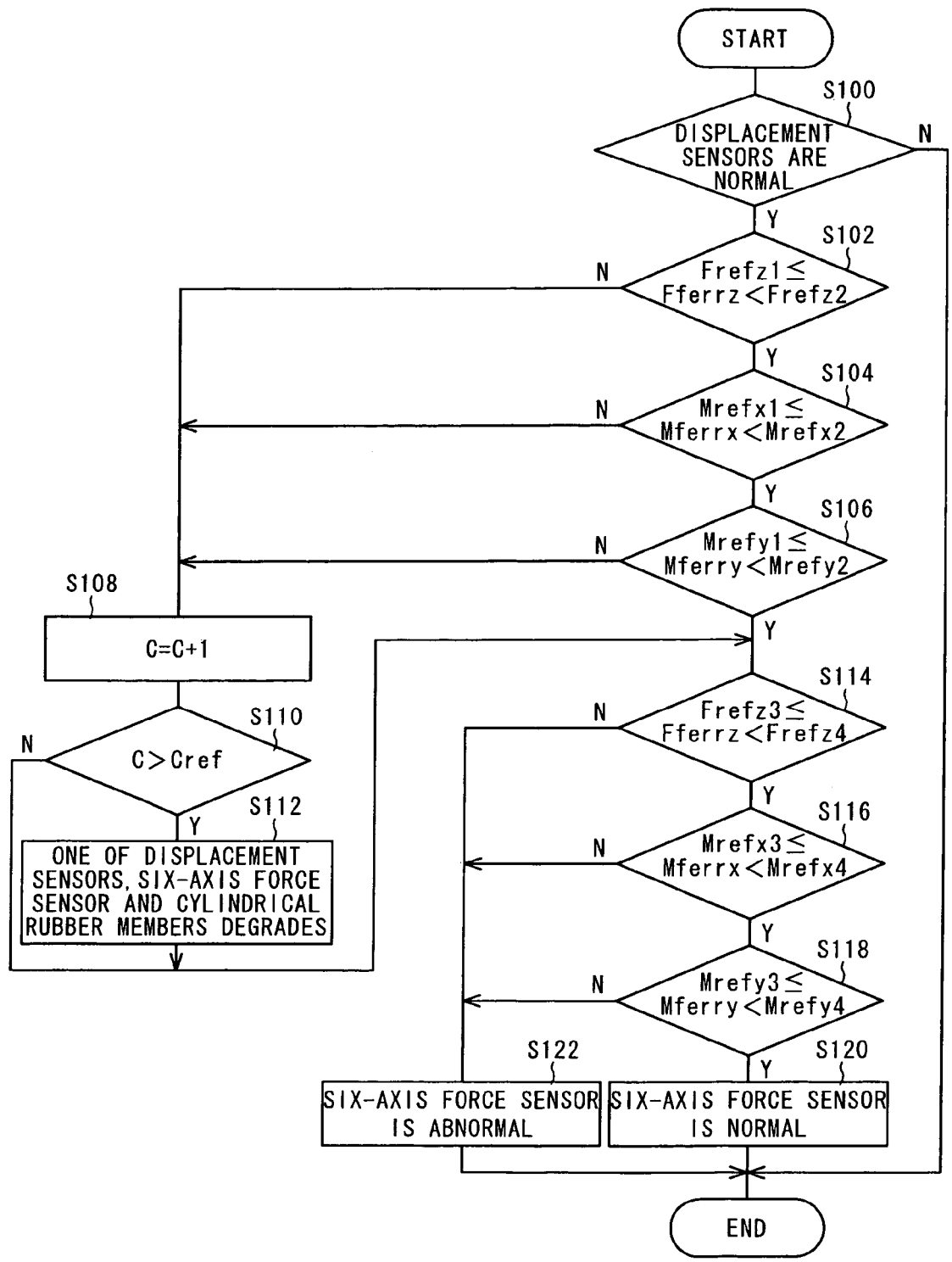
FIG. 9 is a flow chart showing the operation of detecting abnormality or malfunction (i.e., self-diagnosing) of the displacement sensor and a six-axis force sensor in the operation of the legged mobile robot and the floor reaction detection system thereof, according to the third embodiment.

This will be explained with reference to a flow chart of FIG. 9. The program in the figure is also activated at the control unit 26 in every control cycle, e.g., in every 10 msec for each of the right and left legs (leg 2).

The program begins at S100 in which it is determined whether the displacement sensors 70 are detected or determined to be normal. This is done by referring to the bit of the flag explained with reference to the flow chart in FIG. 5 in the second embodiment. When the result at S100 is negative, the program is immediately terminated, since the following abnormality detection cannot be performed. When the robot 1 is walking in this case, if possible, it is preferable to control the robot to stop walking within a short period of time without losing the dynamical equilibrium condition.

When the result at S100 is affirmative, the program proceeds to S102 in which it is determined whether the error Fferrz is equal to or greater than a first Fz permissible value Frefz1 and is less than a second Fz permissible value Frefz2. When the result is affirmative in S102, the program proceeds to S104 in which it is determined whether the error Mferrx is equal to or greater than a first Mx permissible value Mrefx1 and is less than a second Mx permissible value Mrefx2. When the result at S104 is affirmative, the program proceeds to S106 in which it is determined whether the error Mferry is equal to or greater than a first My permissible value Mrefy1 and is less than a second My permissible value Mrefy2.

When the result at S106 (or at S102 and S104) is negative, the program proceeds to S108 in which a count value C is incremented by one, and then to S110 in which it is determined whether the count value C exceeds a predetermined value Cref (appropriately set). The count value C is stored in the backup memory of the control unit 26 and kept even after the power supply thereto is terminated.

When the result at S110 is affirmative, the program proceeds to S112 in which it is determined that at least one of the displacement sensors 70, six-axis force sensor 34 and cylindrical rubber members 382 (more precisely, at least one of the cylindrical rubber members 382) is degraded and, at the same time, the warning light is lit and the display device is made on. When the result at S110 is negative, S112 is skipped.

When the result at S106 is affirmative, the program proceeds to S114 in which it is determined whether the error Fferrz is equal to or greater than a third Fz permissible value Frefz3 and is less than a fourth Fz permissible value Frefz4. When the result is affirmative, the program then to S116 in which it is determined whether the error Mferrx is equal to or greater than a third Mx permissible value Mrefx3 and is less than a fourth Mx permissible value Mrefx4. When the result at S116 is affirmative, the program proceeds to S118 in which it is determined whether the error Mferry is equal to or greater than a third My permissible value Mrefy3 and is less than a fourth My permissible value Mrefy4.

When the result at S118 is affirmative, the program proceeds to S120 in which it is determined that the six-axis force sensor 34 is normal. Contrary, when the result at any of S114, S116 and S118 is negative, the program proceeds to S122 in which it is determined that abnormality such as wire disconnection has occurred in the six-axis force sensor 34, and, at the same time, the warning light is lit and display device is made on.

The fact that the errors are not within the permissible ranges (set to be narrower than the degradation-discrimination permissible ranges) indicates that the errors become values that cannot occur at degradation. Although whichever of the displacement sensors 70, six-axis force sensor 34 and cylindrical rubber members 382 may be a cause, the displacement sensors 70 can be excluded since it has experienced the determination at S100. In addition, since the structure of the six-axis force sensor 34 is more complicated than that of the displacement sensors 70, once abnormality other than degradation has occurred, the six-axis force sensor 34 is likely to outputs a value far beyond the permissible ranges immediately. For that reason, when the result at any of S114, S116 and S118 is negative, it is determined or self-diagnosed that abnormality has occurred in the six-axis force sensor 34.

The first and second permissible values are set to properly selected values that enable to determine whether the displacement sensors 70, etc., degrade. Here, "degradation" means that it is not normal, but is not yet abnormal (not failed). Accordingly, yet the result at S100 is affirmative, the displacement sensor 70 is included as the subject to be determined at S112, since the possibility mentioned above still remains.

The third and fourth permissible values used from S114 to 118 are determined such that the permissible ranges defined by them are set to be narrower than that defined by the first and second permissible values used from S102 to 106, and are determined to properly selected values that enables to determine whether abnormality has occurred in the six-axis force sensor 34.

If it is determined at S122 that the six-axis force sensor 34 is abnormal, instead of the output of the six-axis force sensor 34, the floor reaction force estimated from the outputs of the displacement sensors 70 should be used in the composite compliance control or floor shape estimation. At that time, when the robot walking is in progress, the robot 1 should be controlled to stop walking within a short period of time, without losing dynamic equilibrium condition.

In the case of using the estimated value obtained from the outputs of the displacement sensors, instead of that of the six-axis force sensor output, it is preferable to change a gain and a characteristic of compensating circuit in the composite compliance control or floor shape estimation. This is because the floor reaction force estimated from the outputs of the displacement sensors 70 is inferior, in terms of response, to the detected value of the six-axis force sensor 34.

In the processing from S102 to 106 and S114 to 118, it is alternatively possible to filter the errors through a low-pass filter (not shown), to calculate absolute values of the filtered values and the calculated absolute values are then compared with appropriate values determined through experimentation beforehand. Further, by counting the number of times S114 to S118 found negative and by comparing the count with an appropriate value, it is alternatively possible to determine whether the six-axis force sensor 34 is abnormal. Although the errors between the calculated value and detected value are used in the processing at S102 to 106 and S114 to 118, ratios of the calculated value to the detected value can instead be used.

In the third embodiment, it is thus configured to have the displacement sensors 70 disposed in the cylindrical rubber members 382 located at a position between the ankle joint 18, 20 and floor contact end of foot 22 and generating the outputs indicating the displacement of the floor contact end of the foot 22 relative to the ankle joint 18, 20, and the observer 90 that calculates the floor reaction forces Ffbz (force component acting in the vertical direction), and Mfbx, Mfby (moment components acting about axis that orthogonally intersects the vertical axis) acting on the foot 22 based on the outputs Ln of the displacement sensors 70 with the use of the model describing the relationship between the displacement and the stress Fn generated in the cylindrical rubber members 382 by the aforesaid displacement. With this, the floor reaction force can be accurately calculated, thereby enabling to control the robot 1 to walk stably.

Further, the model is configured to have the spring having spring constant Kb, dumper having dumping constant D arranged in series therewith and spring having spring constant Ka arranged in parallel therewith. In other words, it is configured to use the model designed by taking into account the dumping constant (characteristic) D of the cylindrical rubber members 382, thereby enabling to obtain the estimated value of the floor reaction force having excellent frequency characteristic, i.e., to calculate the floor reaction force with high response.

Furthermore, it is configured to estimate the floor reaction force by estimating dumper's displacement Xn by the observer 90, it becomes possible to further enhance the detection accuracy in calculating the floor reaction force.

Further, it is configured such that the six-axis force sensor (second floor reaction force detector) 34 (that generates the output indicative of the floor reaction force acting on the foot 22 from a floor surface which the robot 1 contacts), is disposed at a position between the ankle joint 18, 20 and the floor contact end of the foot 22, it becomes possible to provide a dual sensory system by combining these different kinds of sensors, thereby enabling to enhance the detection accuracy.

Further, it is configured to self-diagnose whether at least one of the displacement sensors 70, six-axis force sensor 34 and cylindrical rubber members 382 degrade or become abnormal on the basis of the floor reaction force calculated from the outputs of the displacement sensors 70 and that detected from the output of the six-axis force sensor 34, more specifically, based on their errors Fferrz, Mferrx, Mferry. The degradation or abnormality, therefore, can be easily and promptly self-diagnosed, thereby enabling to further enhance the detection accuracy.

Further, since it is configured such that the warning light is lit and the display device is made on when the degradation or abnormality is detected, it makes possible to inform the fact to an operator. From this, when the six-axis force sensor 34 is self-diagnosed to be normal, the detection of the floor reaction force from the outputs of the six-axis force sensor 34 is continued. On the other hand, when the six-axis force sensor 34 is self-diagnosed to be abnormal, it is possible to take an appropriate action such as stopping the robot walking within a short period of time, without losing the dynamical equilibrium condition.

In the spring mechanism model in the third embodiment, instead of defining Xn as the quantity of state, values determined from the following Eqs. 6a, 6b and 6c (indicated by adding "st") can be used. In other words, hst, θstx, θsty can be used as the quantities of state.

$$hst = (X1+X2+X3+X4)/4 \quad \text{Eq. 6a}$$

$$\theta stx = (X2-X4)/d1 \quad \text{Eq. 6b}$$

$$\theta sty = (X3-X1)/d2 \quad \text{Eq. 6c}$$

$$X1+X3-X2-X4=0 \quad \text{Eq. 7}$$

As shown in FIG. 8(*b*), based on Eqs. 1, 2(Eq. 2-1), 3a, 3b, 3c, 4a, 4b,4c, 6a, 6b and 6c, the observer 90 may use a model (spring mechanism model) having hst, θstx, θsty as the quantities of state, while inputting h, θx, θy and outputting Ffbz, Mfbx, Mfby.

In this case, although the number of quantity of state decreases by one, it does not cause a problem. Since, if the linearity is established as shown in Eq. 2, ratios of d(X1)/dt:d(X2)/dt:d(X3)/dt:d(X4)/dt converge with passage of time (more specifically, after a period of time (sufficiently longer than a time constant of the spring mechanism expressed by Eq 2) has passed), to those of d(L1)/dt:d(L2)/dt:d(L3)/dt:d(L4)/dt, regardless of its initial condition, and the relationship expressed in Eq. 7 can be almost established. Therefore, one independent variable can be decreased. It should be noted that, if Eq. 2-1 is used, since the system becomes nonlinear and it does not have the above-mentioned property, it becomes impossible to design the spring mechanism model shown in FIG. 8(*b*).

It should be noted that, in the third embodiment, a temperature sensor may be installed to detect temperature such that the spring constants Ka, Kb and dumping constant D are compensated by the detected temperature.

Figure 10:
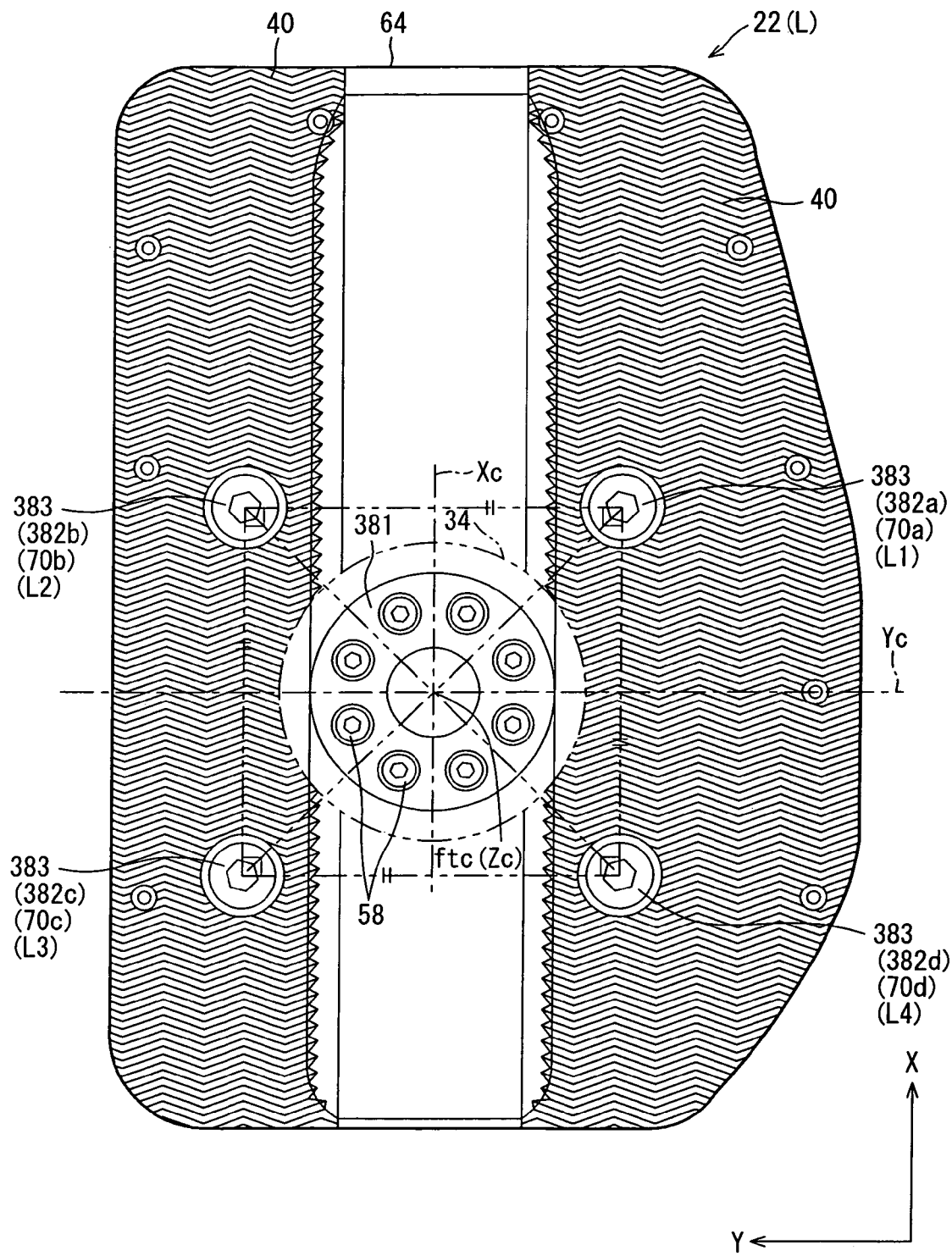
FIG. 10 is a view, similar to FIG. 3, but showing a legged mobile robot and a floor reaction force detection system according to a fourth embodiment of the invention, specifically the configuration of a left foot 22L of feet 22R, L of the legged mobile robot.

FIG. 10 is a view, similar to FIG. 3, but showing a legged mobile robot and a floor reaction force detection system according to a fourth embodiment of the invention, specifically the configuration of a left foot 22L of feet 22R, L of the legged mobile robot.

In the fourth embodiment, as will be understood when comparing FIG. 10 with FIG. 3, the location of the cylindrical rubber members 382 is rotated right by 45 degrees from that illustrated. Since the structure of the third embodiment is obtained by adding only geometrical rotational transformation to that of the first embodiment, the rest of the structure and effect is the same as that of the first embodiment.

In this fourth embodiment as well as the aforesaid first embodiment, for the ease of calculation, it is configured such that the cylindrical rubber members 382 having the displacement sensors 70 therein are arranged in such a manner that each pair of opposed ones is evenly spaced apart with each other, i.e., the lines (dashed line) connecting them form a square shape. However, it may be arranged such that only paired members are positioned evenly spaced apart with each other such that a rectangular shape is formed, or the four members may be arranged unevenly spaced apart to be a trapezoid, i.e., it may be arranged to have any shape. Further, the number of the displacement sensors is not limited to four but can be five or more.

Figure 11:
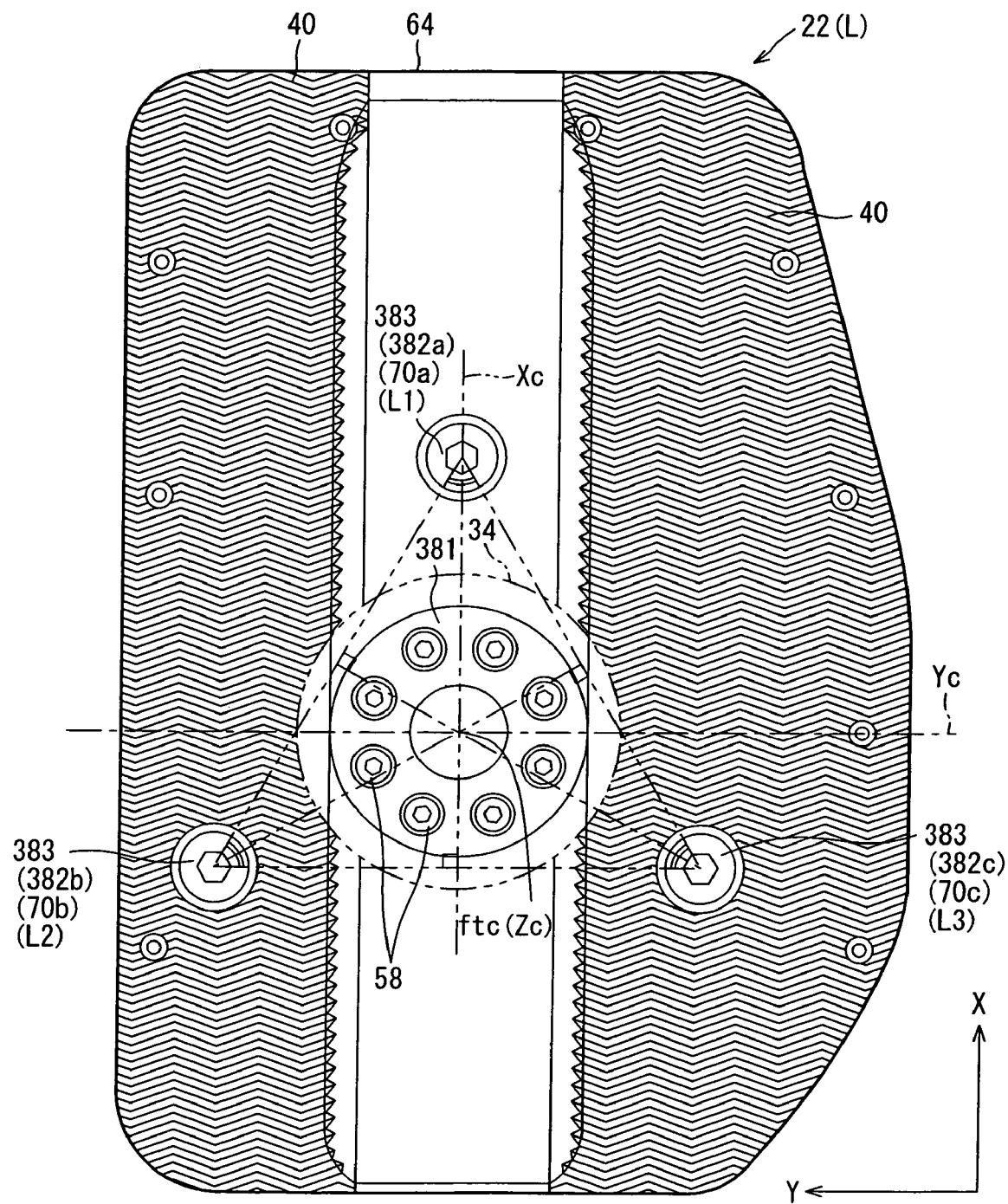
FIG. 11 is a view, similar to FIG. 3, but showing a legged mobile robot and a floor reaction force detection system according to a fifth embodiment of the invention, specifically the configuration of a left foot 22L of feet 22R, L of the legged mobile robot.

FIG. 11 is a view, similar to FIG. 3, but showing a legged mobile robot and a floor reaction force detection system according to a fifth embodiment of the invention, specifically the configuration of a left foot 22L of feet 22R, L of the legged mobile robot.

In the fifth embodiment, as shown in the figure, the six-axis force sensor 34 is located in such a manner that the sensitivity center line Zc thereof is positioned at the center of gravity or center of mass of the triangle formed by the three cylindrical rubber members 382 (382*a*, 382*b*, 382*c*), whilst the displacement sensors 70*a*, 70*b*, 70*c* are disposed in the cylindrical rubber members respectively.

Since the number of the displacement sensors 70 is three, it is impossible to detect or self-diagnose whether the displacement sensors 70 are abnormal. In that sense, the illustrated configuration is a simple alteration of that of the first and second embodiments. Nevertheless, since a plane can be still formed by the three displacement sensors 70, it is possible to estimate or calculate the floor reaction force with respect to the aforesaid three axes.

It should be noted that, although the number of the displacement sensors 70 is three in the fifth embodiment and four in the first to fourth embodiments, it is not limited thereto. The number of displacement sensor 70 may be one at minimum. In that case, however, only the force component in the vertical-axis direction (the aforesaid Ffbz) of the floor reaction force can be estimated or calculated and the abnormality detection described in the second embodiment cannot be performed.

When the number of the displacement sensors 70 is made two, among of the components of the floor reaction force, in addition to the force component in the vertical-axis direction (the aforesaid Ffbz), the moment component about a horizontal axis that orthogonally intersects a line connecting the two displacement sensors 70 can be detected or calculated. If the number of the displacement sensors 70 is made three, as mentioned above, the three-axes force components of the floor reaction force can be estimated or calculated.

Figure 12:
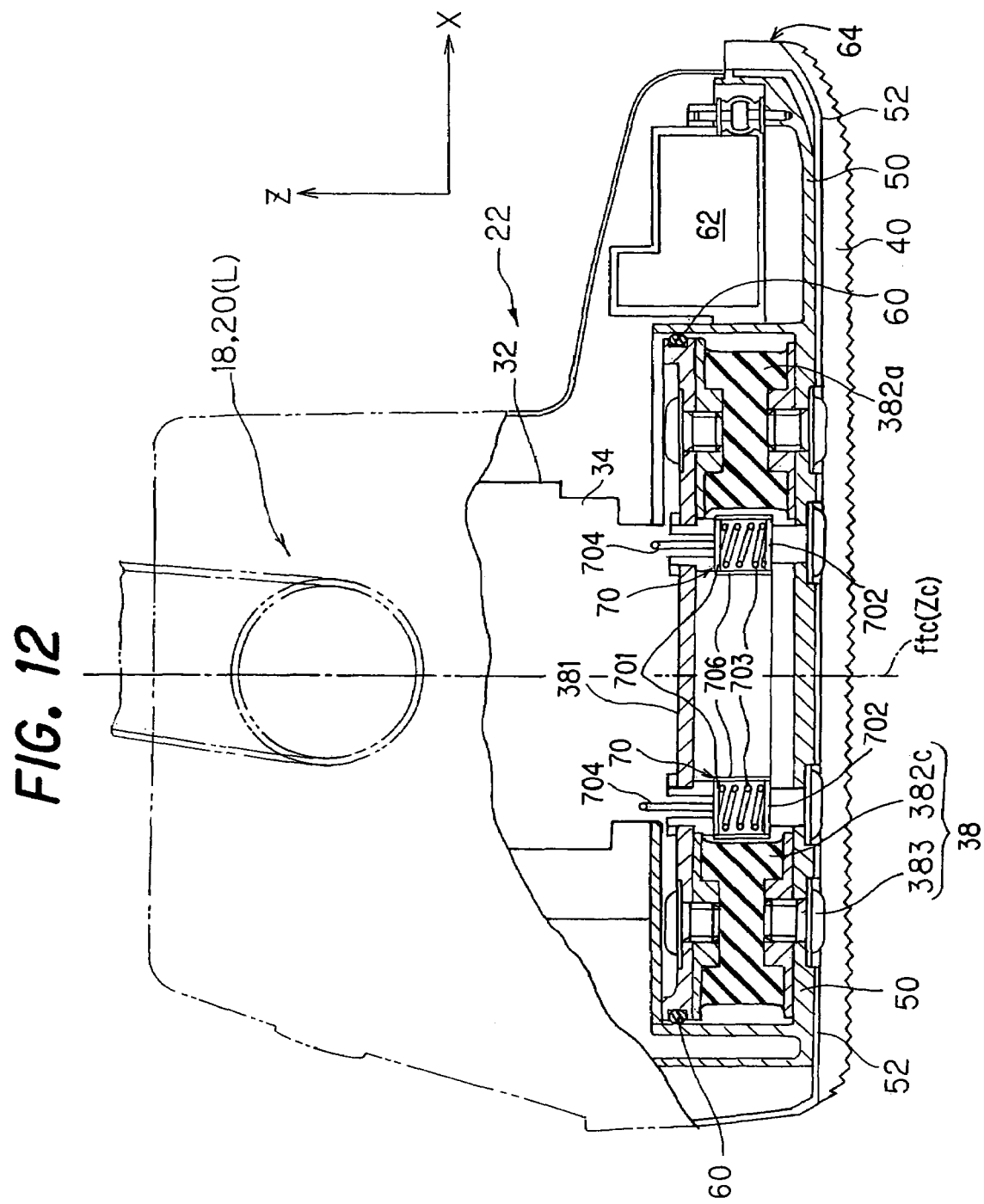
FIG. 12 is a view, similar to FIG. 2, but showing a legged mobile robot and a floor reaction force detection system according to a sixth embodiment of the invention.
Figure 13:
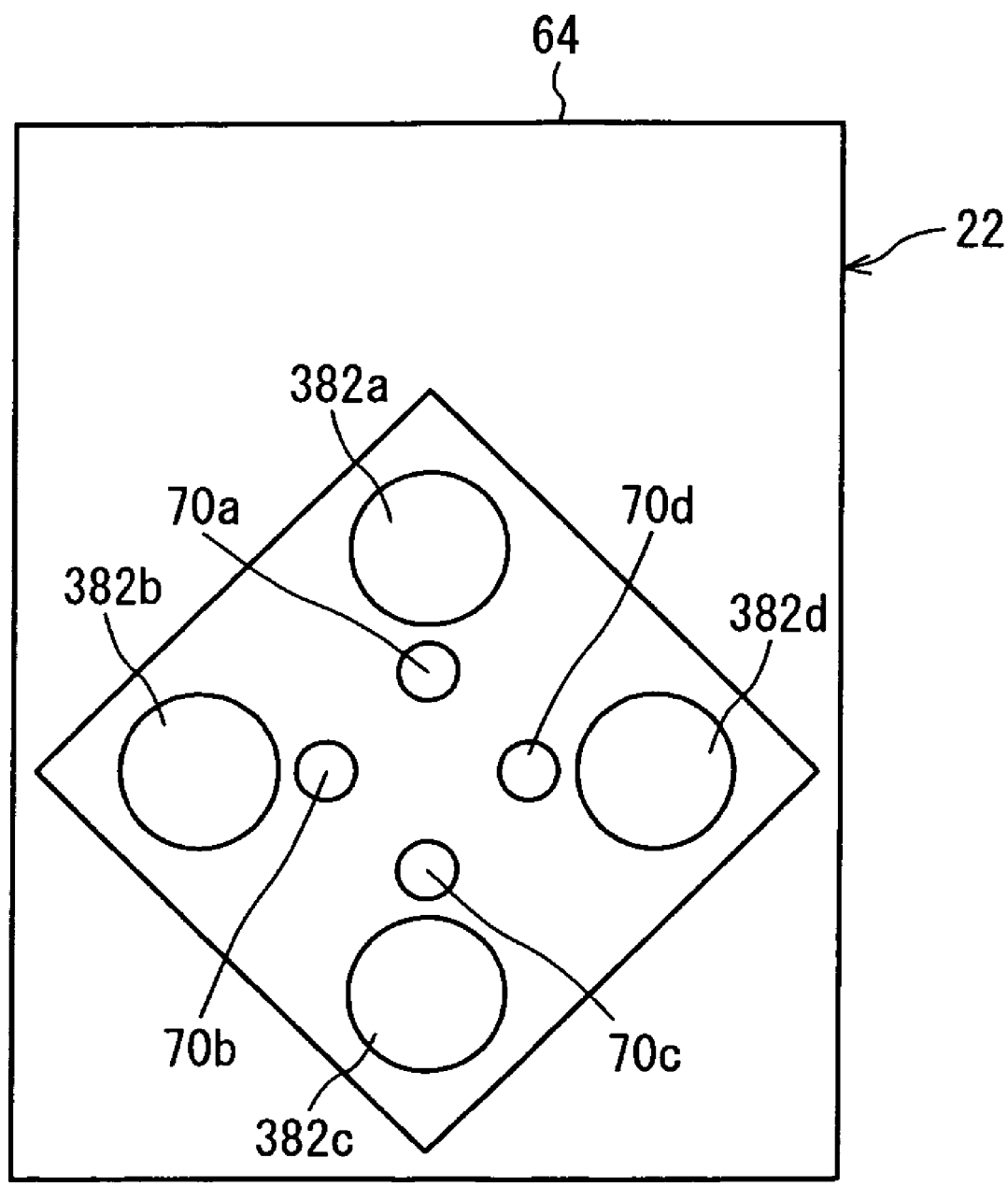
FIG. 13 is a schematic bottom view of a foot illustrated in FIG. 12.

FIG. 12 is a view, similar to FIG. 2, but showing a legged mobile robot and a floor reaction force detection system according to a sixth embodiment of the invention and FIG. 13 is a schematic bottom view of a foot illustrated in FIG. 12.

In the sixth embodiment, it is configured such that, in the configuration of the first embodiment illustrated in FIG. 3, the four cylindrical rubber members 382 are disposed at a position between the ankle joint 18, 20 and floor contact end of the foot 22 and the four displacement sensors 70 (made of the sensing element and converter) are located in a space defined by the top-to-bottom height of each cylindrical rubber member 382. More specifically, they are not housed in the cylindrical rubber members 382, but is position in the vicinity thereof (more precisely, on a line connecting the two cylindrical rubber members 382 that oppose with each other), thereby enabling to detect the displacement of the floor contact end of the foot 22 relative to the ankle joint 18, 20.

As shown in FIG. 12, similar to the first embodiment, each of the displacement sensors 70 comprise the capacitance type pressure-sensitivity sensor 701 of a plate-like shape, the plate member 702 disposed at an opposite position thereof, and the spring 703 disposed between the pressure-sensitivity sensor 701 and plate member 702 to bias the pressure-sensitivity sensor 701. The sensing element and converter (neither shown) are integrally housed in the pressure-sensitivity sensor 701. Outputs of the converter is taken from the harness 704 and sent to the control unit 26. The displacement sensors 70 are airtightly housed in the housing 706, i.e., inside the sealed space.

Since the sixth embodiment is configured as mentioned above, similar to the first embodiment, it becomes possible to make the sensor (including their components such as the converters) compact to be housed in the limited space of the elastic members at the foot of the legged mobile robot.

Figure 14:
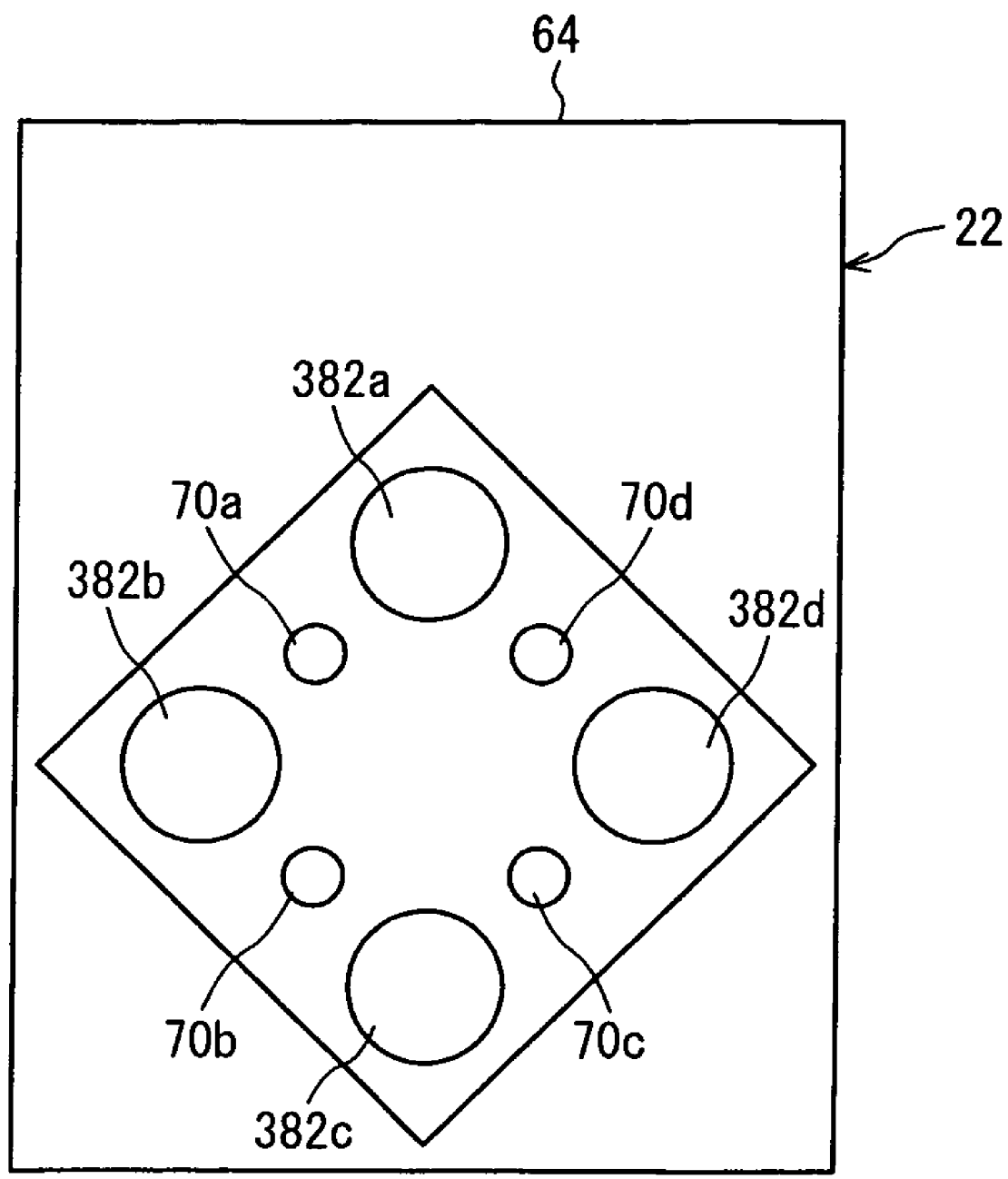
FIG. 14 is a schematic bottom view of the foot showing an alteration of a legged mobile robot and a floor reaction force detection system according to the sixth embodiment.
Figure 15:
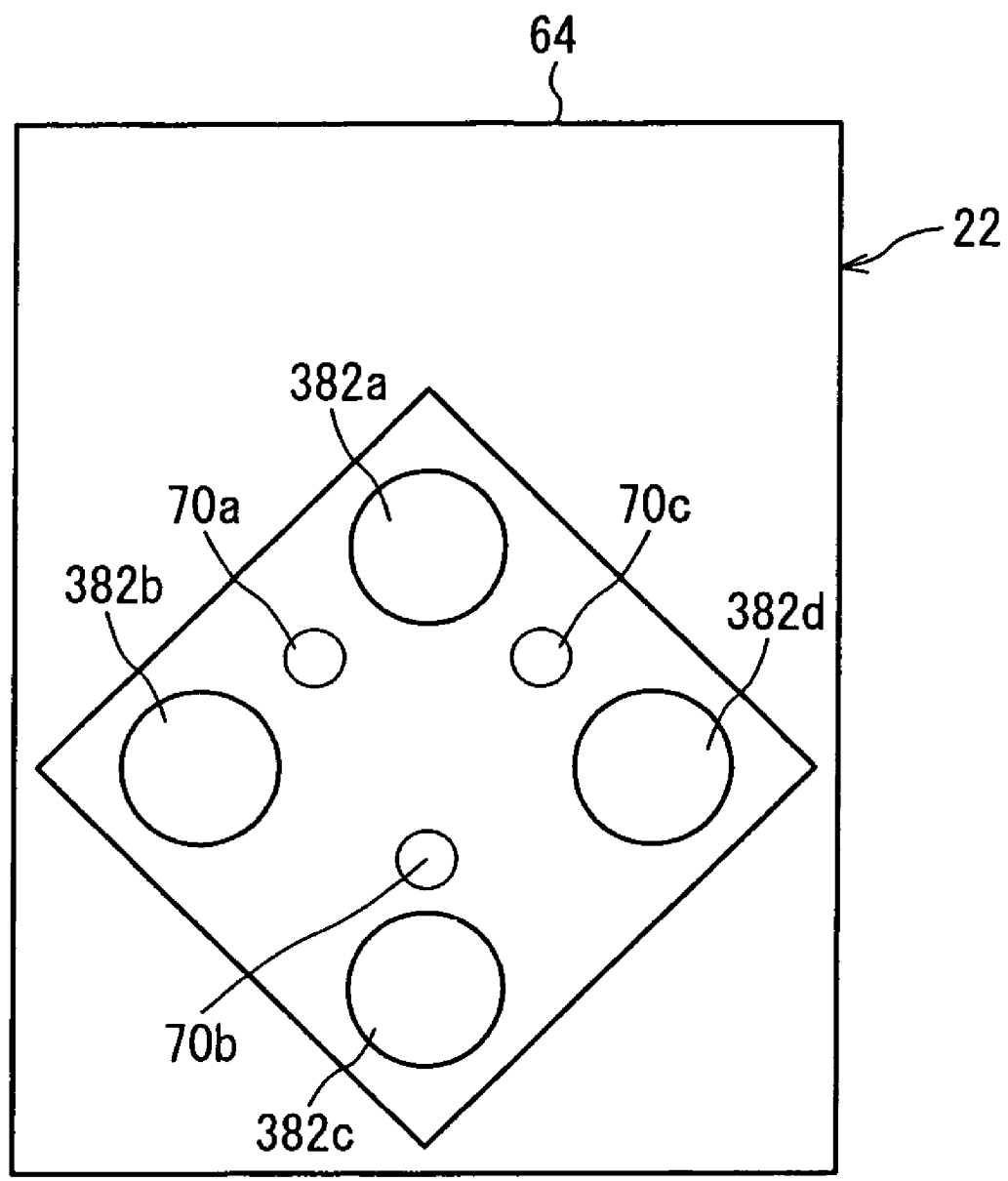
FIG. 15 is a schematic bottom view of the foot showing another alteration of a legged mobile robot and a floor reaction force detection system according to the sixth embodiment.

In the sixth embodiment, the displacement sensors 70 may be arranged as illustrated in FIG. 14. In other words, they may be located on a line (not shown) connecting the two adjacent cylindrical rubber members 382. Further, the number of the displacement sensors 70 may be different from that of the cylindrical rubber members 382, as shown in FIG. 15. The rest of the arrangement and effects is the same as that of the first embodiment.

Figure 16:
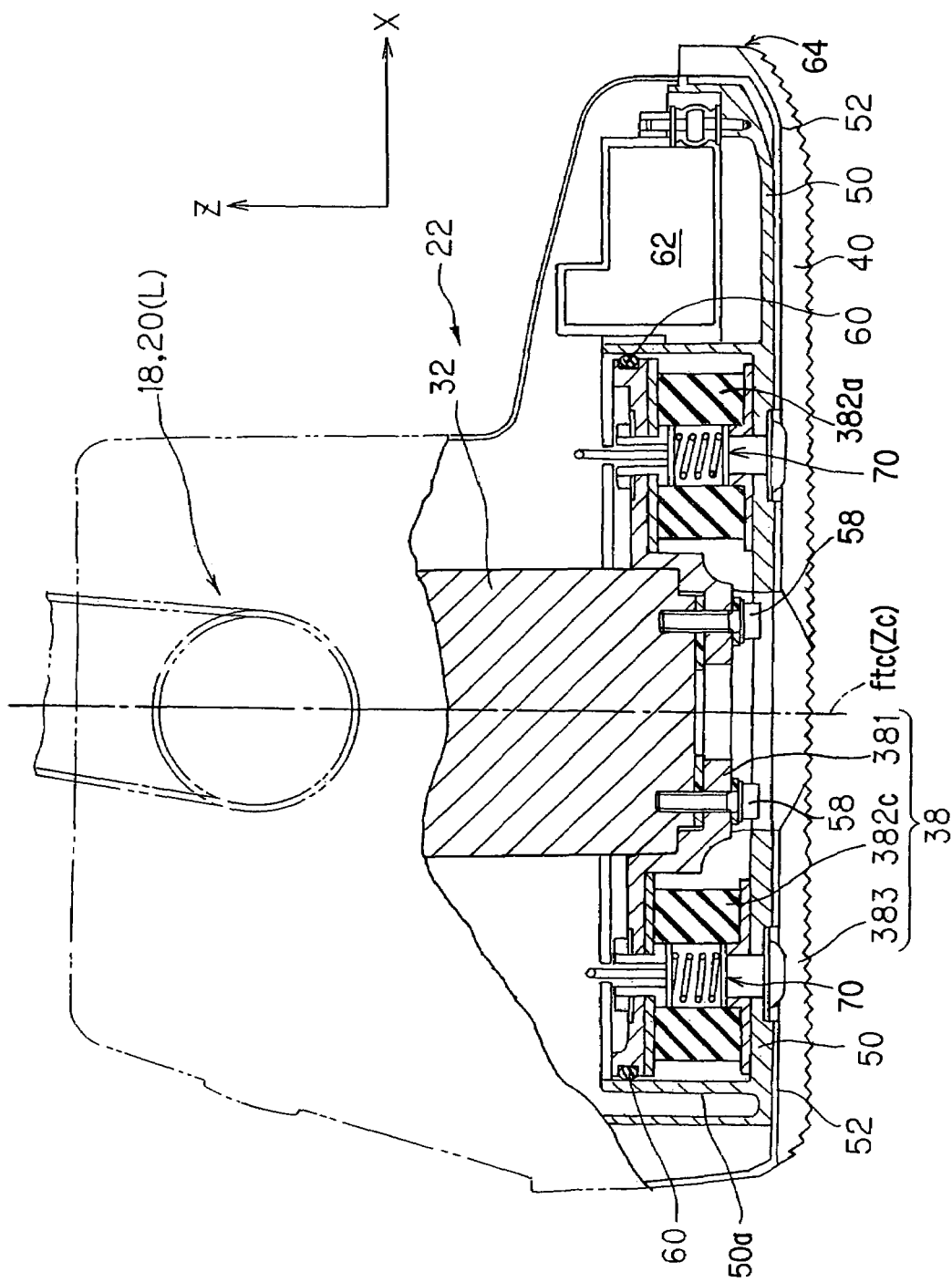
FIG. 16 is a view, similar to FIG. 2, but showing a legged mobile robot and a floor reaction force detection system according to a seventh embodiment of the invention.

FIG. 16 is a view, similar to FIG. 2, but showing a legged mobile robot and a floor reaction force detection system according to a seventh embodiment of the invention.

In the seventh embodiment, it is configured such that the six-axis force sensor 34 is removed and the displacement sensors 70 are housed or disposed in the four cylindrical rubber members 382, respectively. Accordingly, also in the seventh embodiment, the self-diagnosis of the displacement sensors are carried out and only the floor reaction force estimated from the outputs of the displacement sensors 70 is sent to the control unit 26. The control is performed based on the estimated value. Except for the fact that the inverted-Ω-like frame 381 is fastened to the end-side link 32 by the bolts 58, the rest of the structure and effect is the same as that of the above embodiment.

Figure 17:
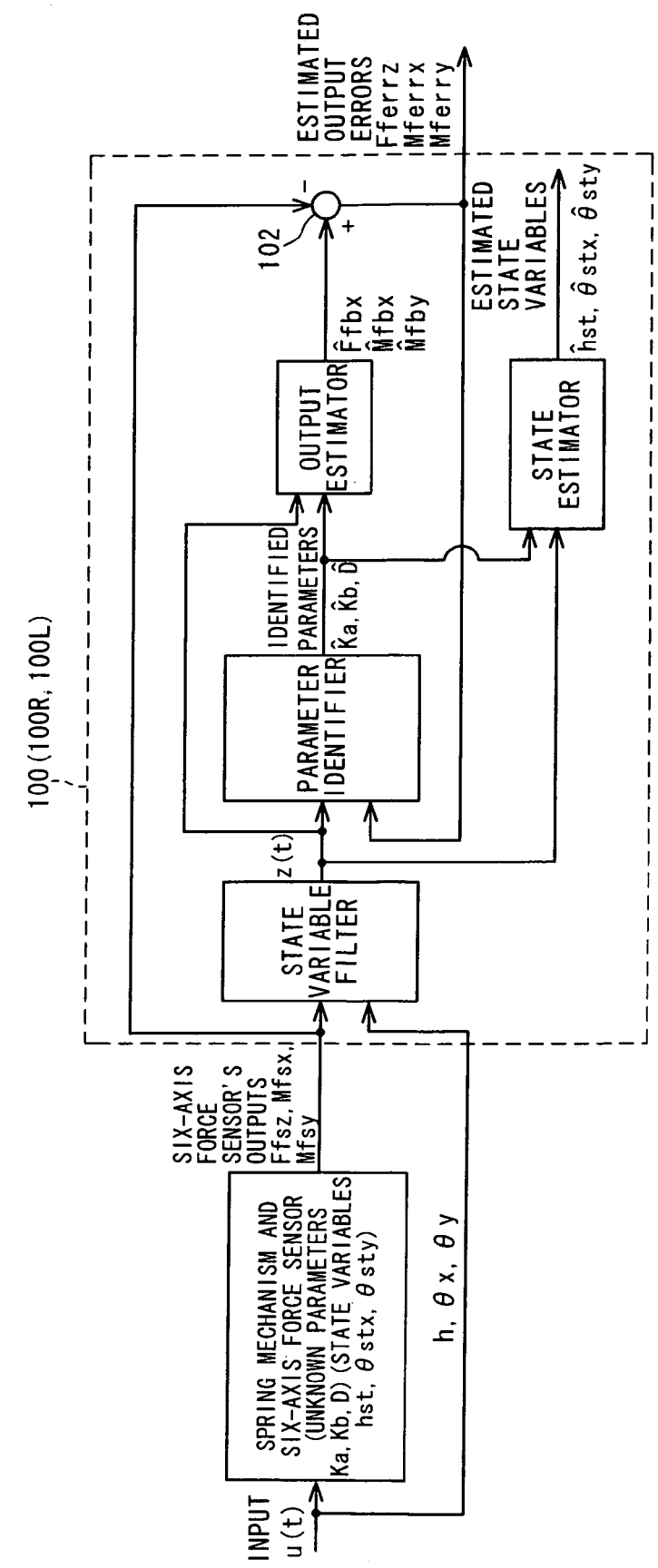
FIG. 17 is an explanatory view showing the configuration of a legged mobile robot and a floor reaction force detection system according to an eighth embodiment of the invention.

FIG. 17 is an explanatory view showing the configuration of a legged mobile robot and a floor reaction force detection system according to an eighth embodiment of the invention.

In the eighth embodiment, it is configured to add an adaptive observer to the structure of the third embodiment. The viscoelastic characteristic of the cylindrical rubber members 382 highly depends on temperature and hence, in the viscoelastic model explained above, the spring constants Ka, Kb and dumping constant D are likely to change greatly with the temperature. Further, the spring constants Ka, Kb and dumping constant D may change (degrade) after having used for a long period of time. If the compensation is attempted by disposing a temperature sensor, the configuration becomes complicated. In any rate, it can not cope with the change with time.

As a result, if the parameters (Ka, Kb, D) in Eq. 2 are deemed as constants, an error occurs in estimation (calculation) of the floor reaction force from the outputs of the displacement sensors 70 due to the temperature dependency and change with time.

In view of the above, in the eighth embodiment, it is configured to identify these parameters using the adaptive observer such that the floor reaction force is estimated or calculated from the estimated value obtained, thereby enabling to enhance the accuracy to estimate the floor reaction force from the outputs of the displacement sensor 70.

The abnormality of the displacement sensors 70 is self-diagnosed in the first embodiment and the degradation of the cylindrical rubber members 382 and displacement sensors 70, etc., as well as the abnormality of the six-axis force sensor 34 are self-diagnosed in the third embodiment. Aside from the above, in the eighth embodiment, the parameters of the model indicating the spring constants Ka, Kb and dumping constant D are identified by the adaptive observer such that degradation of the cylindrical rubber members 382 can be accurately self-diagnosed from the parameter-identified values obtained accordingly.

The adaptive observer comprises an identifier mechanism which identifies unknown parameters in the observer coping with the case that parameter values change with environmental change around the system or the case that the parameter values cannot be determined accurately. The structure of the observer is as shown in FIG. 17. The adaptive observer illustrated in the figure is publicly known. For example, it is described in "Modem Control Series; Observer" (Corona Publishing Co., Ltd. October, 1988).

Explaining this with reference to the figure, the adaptive observer 100 includes a state variable filter that inputs state variables, a parameter identifier, an output estimator and a state estimator. As mentioned above, since the six-axis force sensors 34 and displacement sensors 70 are installed in each of the right and left legs, the adaptive observer 100 is provided for each of the right and left legs. Specifically, the adaptive observer 100R is installed for the right leg and adaptive observer 100L is installed for the left leg. Although the input values are different from each other, since the calculations performed therein are the same, the addition of R and L is omitted in FIG. 17.

The adaptive observer 100 is inputted with Ffsz, Mfsx, Mfsy that are the outputs of the six-axis force sensor 34 and are corresponding to those estimated from the outputs of displacement sensors 70 and are the same as the three axis components Ffbz, Mfbx, Mfby obtained from Eq. 3. The adaptive observer is also inputted with the relative height h relative to the sole frame 50 (displacement of the contact end of the foot 22 relative the ankle joint 18, 20) of the inverted-Ω-like frame 381 that supports the cylindrical rubber members 382, the relative inclination θx about the X-axis (not shown) and the relative inclination θy about the Y-axis, all of which are obtained from Eq. 4.

h, θx and θy are calculated from the contraction amount Ln of the cylindrical rubber members 382 (value detected by the displacement sensors 70), using Eq. 4.

In the adaptive observer 100, the parameter identifier identifies the spring constants $\hat{K}a$, $\hat{K}b$ and the dumping constant $\hat{D}$ as the identified parameters on the basis of a state variable z(t). The output estimator inputs the state variable z(t) and the identified parameters and outputs the three axis elements $\hat{F}fbz$, $\hat{M}fbx$, $\hat{M}fby$ as estimated outputs.

The estimated outputs of the output estimator $\hat{F}fbz$, $\hat{M}fbx$, $\hat{M}fby$ are sent to an adder-subtracter 102 in which the outputs of the six-axis force sensor Ffsz, Mfsx, Mfsy are subtracted therefrom and estimated output errors Fferrz, Mferrx, Mferry are calculated. The calculated estimated output errors are outputted directly on one hand, and on the other hand, are sent to the parameter identifier. The state estimator inputs the state variable z(t) and the identified parameters $\hat{K}a$, $\hat{K}b$, $\hat{D}$ and calculates the estimated state values $\hat{h}st$, $\hat{\theta}stx$, $\hat{\theta}sty$ that are estimated values of the aforesaid values hst, θstx, θsty.

In this manner, the adaptive observer 100 identifies the parameters (Ka, Kb, D) used in Eq. 2 and based thereon, calculates the values (that are values calculated from Eqs. 3 and 4). In this specification, the value assigned with the hat sign indicates that it is an estimated value.

When the six-axis force sensor 34 operates normally, since the parameter identifier identifies the spring constants Ka, Kb and dumping constant D based on the state variable z(t) (obtained from the inputs) and estimated output errors Fferrz, Mferrx, Mferry, if the viscoelastic characteristic of the cylindrical rubber members 382 changes with increase or decrease of the environmental temperature, the change can be identified. Thus, by regarding the estimated output as the estimated floor reaction force, it becomes possible to enhance the detection accuracy of the floor reaction force of the displacement sensors 70. Further, it becomes possible to detect or self-diagnose degradation of the cylindrical rubber members 382, etc., by using the parameters identified by the adaptive observer 100.

Figure 18:
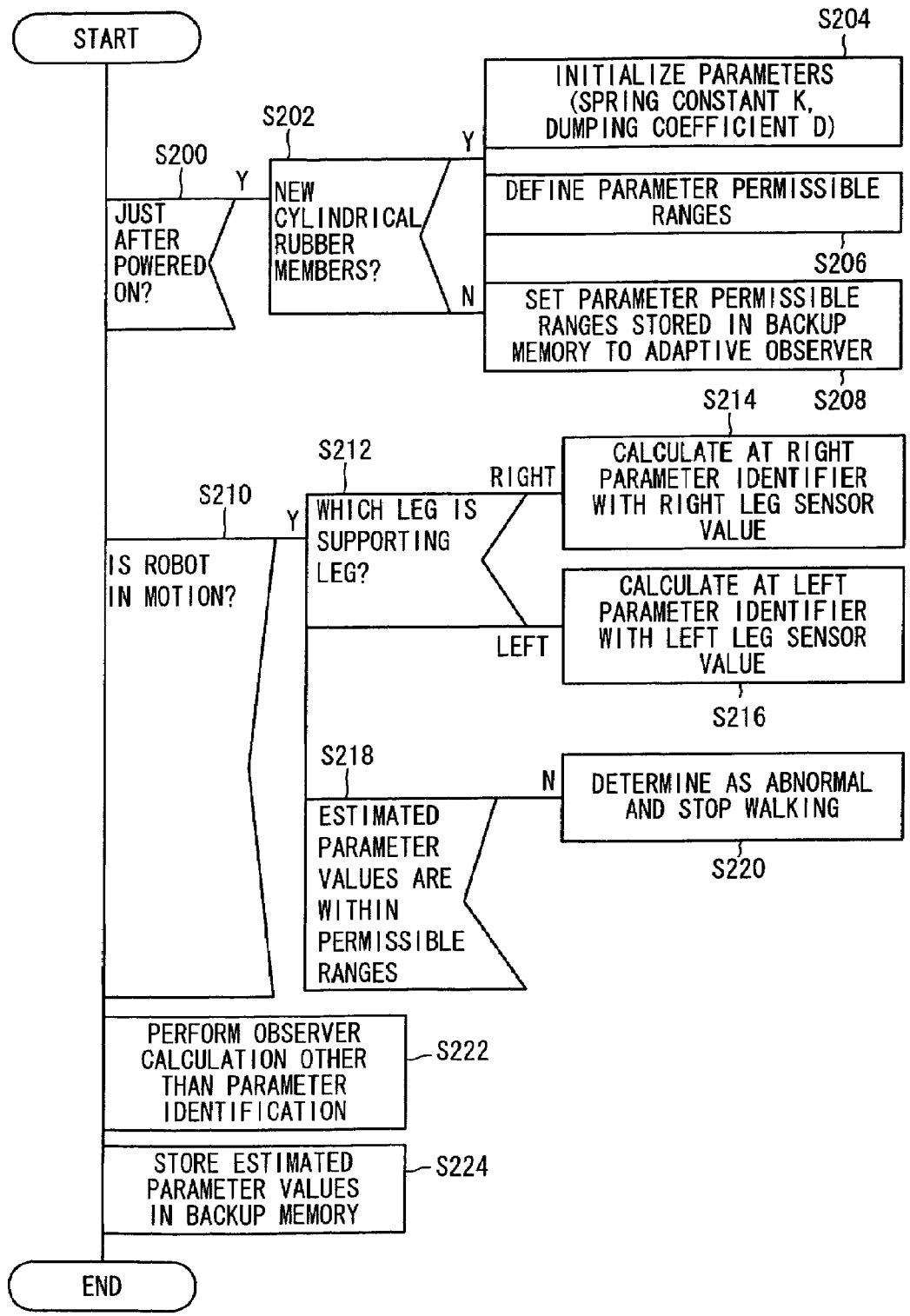
FIG. 18 is a flow chart showing the operation of a legged mobile robot and a floor reaction force detection system according to the eighth embodiment.

FIG. 18 is a flow chart showing the operation mentioned above. The program in the figure is also activated at the control unit 26 in every control cycle, e.g., in every 10 msec.

The program begins at S200 in which it is determined whether the control unit 26 is just powered on, i.e., it is in the very short period after activated by power supply, and when the result is affirmative, the program proceeds to S202 in which it is determined whether the cylindrical rubber members 382 is new. Note that when the cylindrical rubber members 382 are replaced with new ones, the bit of an appropriate flag is to be set to 1. Here, the determination is performed by referring to the bit of the flag.

When the result at S202 is affirmative, the program proceeds to S204 in which the parameters (the spring constants Ka, Kb and dumping constant D) are initialized, i.e., the parameters are set to be values that are the values new ones of the members 382, i.e., the member 382 not degraded would have. The program then proceeds to S206 in which parameter permissible ranges are set. The parameter permissible ranges are set as upper and lower limit values that are obtained by adding (or subtracting) a predetermined value(s) to (from) the parameters or by multiplying a predetermined ratio(s) indicative of permissible changes from the set values (or previous values). The bit of the flag (that is set to 1 when the cylindrical rubber members 382 were replaced) is reset to 0.

On the other hand, when the result at S202 is negative, the program proceeds to S208 in which the parameter values stored in the backup memory, i.e., the last estimated parameter values obtained at previous walking are set as the initial parameter values of the adaptive observer. At the same time, the parameter permissible ranges (set previously) are again set as the parameter permissible ranges for this program loop.

Then the program proceeds to S210 in which it is determined whether the robot 1 is in motion. Here, "in motion" means that the robot motion is under the control of displacement of its center of gravity such as walking. When the result at S210 is affirmative, the program proceeds to S212 in which it is determined which of right and left legs 2 is the supporting leg, and to S214 when the result is the right leg, in which calculation at the parameter identifier of the adaptive observer 100R for the right leg is performed. On the other hand, if the result at S212 is the left leg, the program proceeds to S216 in which similar calculation at the parameter identifier of the adaptive observer 100L for the left leg is performed.

As stated above, the calculation at the parameter identifier (updating of the identified constants $\hat{K}a$, $\hat{K}b$, $\hat{D}$) is performed within the supporting leg period when the robot 1 is in motion. This is because the estimation accuracy of the adaptive observer degrades when the input values to the adaptive observer (detected value of the displacement sensors 70 and six-axis force sensor 34) are slight. If accepting the degradation of the estimation accuracy to some extent, the calculation at the parameter identifier may be performed simultaneously for the both legs, regardless of whether it is the supporting leg period or free leg period. It is also possible to make a parameter estimation gain smaller, when the input to the adaptive observer changes slight, for example, during a free leg period.

The program then proceeds to S218 in which it is determined whether the estimated parameter values, i.e., identified parameters K, D, are within the permissible ranges set at S206 or S208, and when the result at S218 is negative, the program proceeds to S220 in which it is determined or self-diagnosed that the cylindrical rubber members 382, etc., degrade or become abnormal and the robot walking is stopped within a short period of time. At the same time the warning light is lit and the display device is made on.

Further, since the cylindrical rubber members 382 degrade gradually (as time passes), when the one or all of the identified parameters Ka, Kb, D is not within the permissible range(s), taking into account changes in an appropriate past program loop (corresponding to "t" in FIG. 17), if it has been found that the change increases gradually and has been found not within the permissible range at this program loop, it should be determined that the cylindrical rubber members 382 on the corresponding leg side has degraded. With that, it becomes possible to achieve more accurate abnormality detection.

On the other hand, since the structure of the six-axis force sensor 34 is complicated as mentioned above, once abnormality other than degradation arises, the six-axis force sensor 34 is likely to outputs a value far beyond the permissible range immediately. Therefore, when it is determined that the value(s) is not within the permissible range in this program loop, despite the fact that change in the appropriate past program loop is rather small, it is determined that abnormality such as wire disconnection has occurred in the six-axis force sensor 34. In the processing at S220, it may be configured to incorporate the abnormality detection in the second or third embodiment in this embodiment and determine taking the result into account.

The program then proceeds to S222 in which observer calculation other than that at the parameter identifier is performed for both of the right and left legs. When the robot 1 is in motion, the estimated output value, i.e., the floor reaction force estimated value based on the outputs of the displacement sensors 70 $\hat{F}fbz$, $\hat{M}fbx$, $\hat{M}fby$ are calculated on the basis of the updated identified parameters $\hat{K}a$, $\hat{K}b$, $\hat{D}$. Contrary, if the robot 1 is not in motion, the observer calculation is performed to calculate the estimated floor reaction force $\hat{F}fbz$, $\hat{M}fbx$, $\hat{M}fby$, without updating the identified parameters, i.e., by using the previous estimated values.

When the aforesaid composite compliance control is performed on the basis of the calculated floor reaction force, if the calculated values for the respective legs are used immediately, since estimated errors of the parameters may disrupt the right-and-left balance of the robot 1, it is preferable to standardize them (make them uniform), for instance, by obtaining an average of the calculated values. This will be explained in the next embodiment.

The program proceeds to S224 in which the obtained estimated parameter values are stored in the backup memory and the program is terminated. This processing may be performed just before power supply is stopped.

In the eights embodiment, it is thus configured to have the displacement sensors 70 disposed in the cylindrical rubber members 382 located at a position between the ankle joint 18, 20 and the floor contact end of the foot 22 and generating the outputs indicating the displacement of the floor contact end of the foot 22 relative to the ankle joint 18, 20, and the adaptive observer 100 that calculates the floor reaction force estimated errors Fferrx, Mferrx, Mferry indicative of errors between the floor reaction force components $\hat{F}fbz$, $\hat{M}fbx$, $\hat{M}fby$ estimated from the outputs of the displacement sensors 70 and the floor reaction force detected from the output of the six-axis force sensor 34, based on the outputs h, θx, θy of the displacement sensors 70 and the detected floor reaction force components Ffsz, Mfsx, Mfsy, and identifies the model's parameter values Ka, Kb, D. Therefore, When installing the six-axis force sensor 34 at the foot 22 of the robot 1 to detect the floor reaction force and in addition, when installing the displacement sensors 70 (utilizing the viscoelastic characteristic) at the foot 22 to calculate or estimate the floor reaction force, it becomes possible to estimate change in the viscoelastic characteristic due to temperature drift or degradation of the cylindrical rubber members 382, without disposing a temperature sensor, thereby enabling to enhance the detection accuracy.

Further, it is configured to self-diagnose degradation of the cylindrical rubber members 382 and six-axis force sensor 34 or abnormality of the six-axis force sensor 34, it becomes possible to further enhance the detection accuracy.

It should be noted that, in the processing at S218, it is alternatively possible to calculate and store temperature characteristic of the parameters Ka, Kb, D of the cylindrical rubber members 382 in advance, and to determine whether the estimated parameter values are within the permissible ranges with taking that into account. In other words, if the temperature at the cylindrical rubber member itself or of its edge is measured and if the permissible ranges are adjusted for the measured temperature, and if it is determined whether the estimated parameter values are within the adjusted permissible ranges, it becomes possible to further enhance the degradation or abnormality detection accuracy.

It should be also noted that, aside from determining whether the estimated parameter values are within the permissible ranges, the estimated parameter values for each leg may be compared with each other in order to determine the degree of difference in the right and left legs. In that case, although the degradation can be determined without being affected by the temperature dependency of the cylindrical rubber members 382, since it is not possible to judge whether the degradation at the right and left legs are same extent, it is only a subsidiary method.

It should be also noted that, although the adaptive observers 100 are installed at each of the right and left legs, i.e., at the respective feet 22 as the adaptive observer 100R for the right leg and adaptive observer 100L for the left leg, since the calculations are the same as mentioned above, it is possible to install only one adaptive observer for all the legs (feet 22) and to select values to be inputted to the adaptive observer 100 from those of the right or left leg, based on the determination at S212, for instance.

Figure 19:
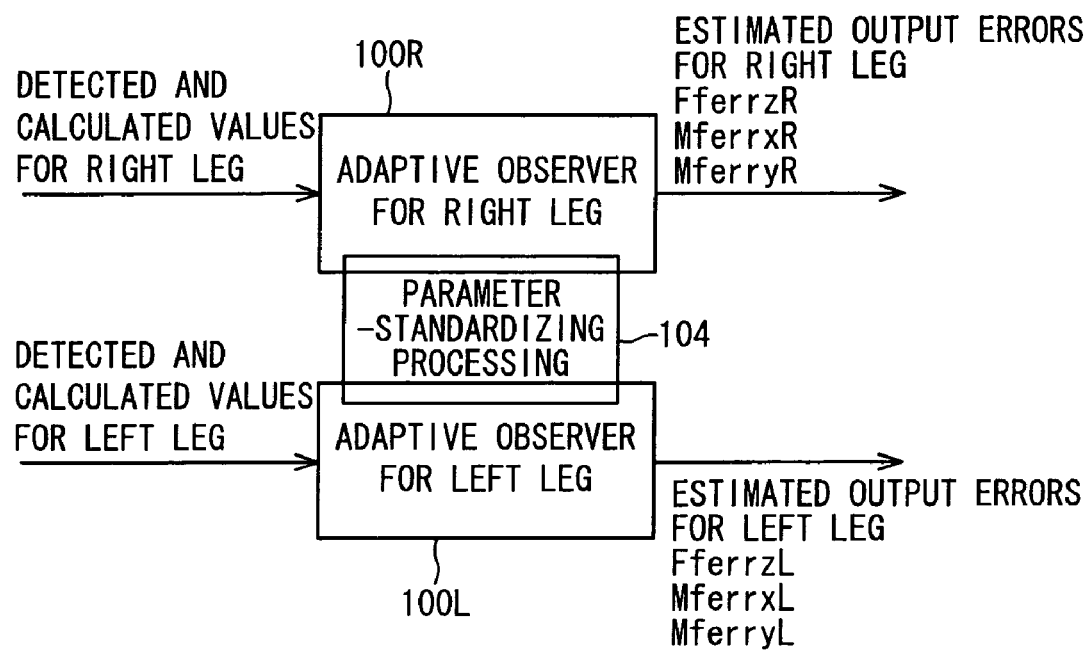
FIG. 19 is an explanatory view showing the configuration of a legged mobile robot and a floor reaction force detection system according to a ninth embodiment of the invention.

FIG. 19 is an explanatory view showing the configuration of a legged mobile robot and a floor reaction force detection system according to a ninth embodiment of the invention.

The ninth embodiment is an alteration of the eighth embodiment. It is configured in this embodiment that the estimated parameter values of the respective parameter identifier in the adaptive observers 100R, 100L are made common at a parameter-standardizing processing block 104. The estimated output errors for the respective legs are calculated based on the standardized estimated parameter values.

Figure 20:
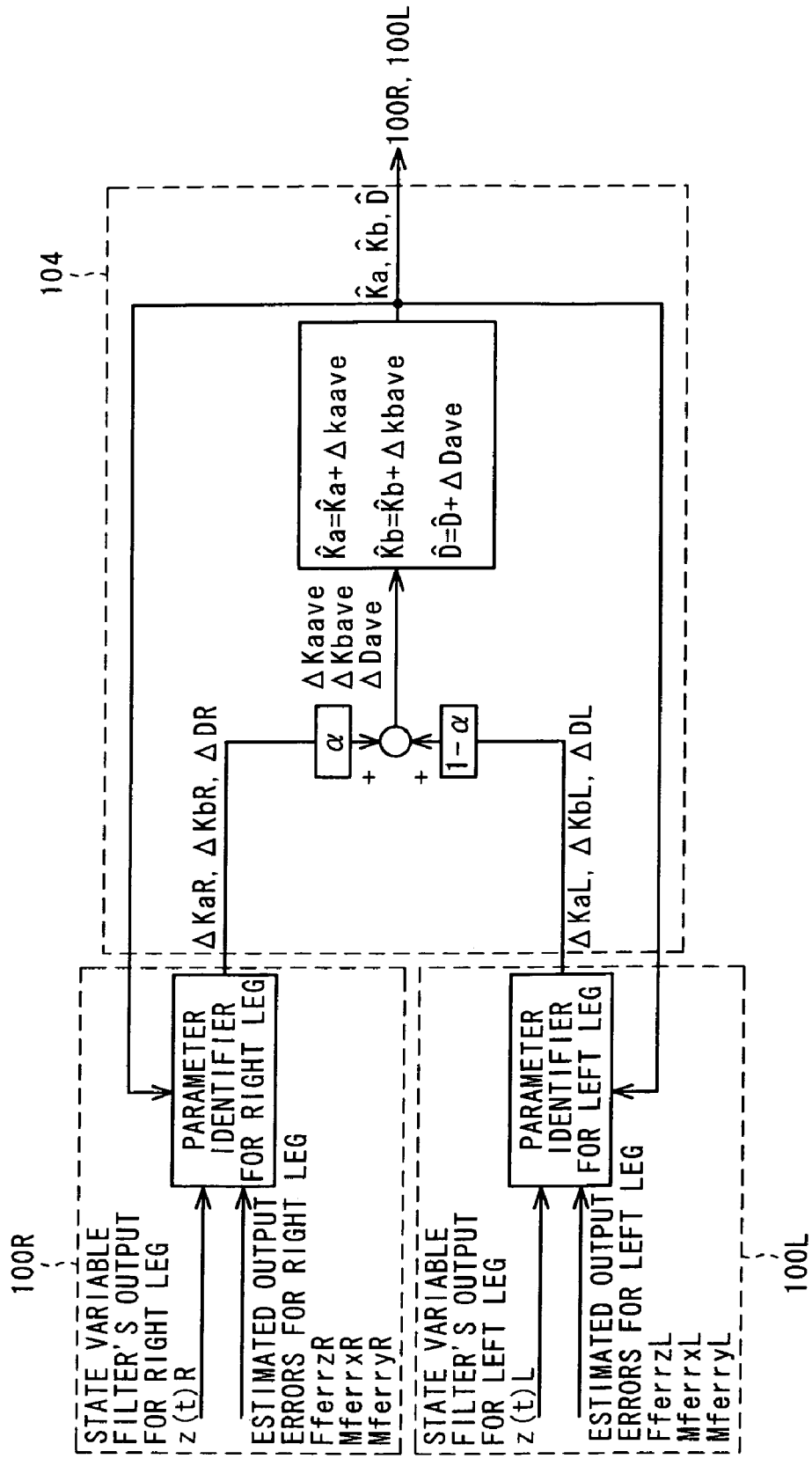
FIG. 20 is an explanatory view showing the structure of a parameter-standardizing process block illustrated in FIG. 19, in detail.

Explaining this with reference to FIG. 20, changed amounts of the estimated parameter value outputted from the parameter identifier in the adaptive observer 100R (i.e., differences between the present and previous values) $\Delta KaR$, $\Delta KbR$, $\Delta DR$ and those in the adaptive observer 100L $\Delta KaL$, $\Delta KbL$, $\Delta DL$ are inputted to the parameter-standardizing processing block 104.

In the parameter-standardizing processing block 104, weight-averages of the output ($\alpha$ may be set to 0.5 for obtaining simple averages) $\Delta Kaave$, $\Delta Kbave$, $\Delta Dave$ are obtained and added to the previous estimated parameter values in order to determine the current estimated parameter values (updated values) $\hat{K}a$, $\hat{K}b$, $\hat{D}$. At the same time, it sends the determined values $\hat{K}a$, $\hat{K}b$, $\hat{D}$ to each of the right/left adaptive observers 100R, 100L.

In the left and right adaptive observers 100R, 100L, the estimated floor reaction force of each leg is calculated based on these standardized estimated parameter values, and based thereon, the estimated output errors are calculated. The estimated parameter values are thus standardized, thereby enabling to avoid robot walking from falling unstable due to the differences between the right and left parameters.

In calculating the weight-averages, it is preferable to set the weight for the supporting leg larger than that for the free leg (i.e., $\alpha$ is set greater when the right leg is free, and smaller when the left leg is free). This is because changes in inputs to the adaptive observer are slight during the free leg period and accordingly the detection accuracy degrades as mentioned above.

Having been configured in the foregoing manner, in the ninth embodiment, despite the fact that the structure of this embodiment is slightly complicated compared to the eighth embodiment, it becomes possible to enhance the estimation accuracy and the self-diagnosis accuracy for the respective legs. The rest of the structure and effect is the same as that of the eighth embodiment.

As stated above, the first to ninth embodiments are configured such that, in a legged mobile robot 1 having at least a body 24 and a plurality of legs 2 each connected to the body through a first joint (hip joints 10, 12, 14), and each having a foot 22 connected to a distal end of the leg through a second joint (ankle joints 18, 20), there are provided with an elastic member (cylindrical rubber member 382) at a position between the second joint and a floor contact end of the foot, a displacement sensor 70 having the sensing element and the converter in a space defined by top-to-bottom height ht of the elastic member such that a displacement of the floor contact end of the foot relative to the second joint h (Ln) can be detected.

Further, it is configured such that a plurality of (three or four) the elastic members (cylindrical rubber members 382) are installed at the position between the second joint and the floor contact end of the foot, at separate locations when viewed from top.

Further, it is configured in the first embodiment, etc., such that the displacement sensors 70 are each housed in the elastic members (cylindrical rubber members 382) such that the displacement of the floor contact end of the foot relative to the second joint can be detected.

Furthermore, it is configured in the sixth embodiment, such that the displacement sensors, more specifically the displacement sensors 70 are each installed in the vicinity of the elastic members (cylindrical rubber members 382) such that the displacement of the floor contact end of the foot relative to the second joint can be detected.

Further, it is configured such that a plurality of the elastic members (cylindrical rubber members 382) are located at the edge of the foot 22 when viewed from top.

Further, it is configured such that the displacement sensor 70 is housed in a sealed space.

Further, it is configured such that each of the displacement sensors 70 comprises a spring (spring 703) and a pressure-sensitivity sensor 701.

Further, it is configured such that rigidity of the spring 703 is set to be lower than that of each of the elastic members (cylindrical rubber members 382).

Further, it is configured such that, in a legged mobile robot 1 having at least a body 24 and a plurality of legs 2 each connected to the body through a first joint (hip joints 10, 12, 14), and each having a foot 22 connected to a distal end of the leg through a second joint (ankle joints 18, 20), there are provided with a plurality of displacement sensors 70 in a space defined by a first rigid member (inverted-Ω-like frame 381) connected to the second joint and a second rigid member (sole frame 50) connected to a floor contact end of the foot at locations spaced apart with each other when viewed from top that produces outputs indicative of a displacement of the floor contact end of the foot relative to the second joint h (Ln), a discriminator (control unit 26, S12) that discriminates whether the outputs Ln of the displacement sensors satisfy a predetermined geometric relationship, and a self-diagnoser (control unit 26, S14) that self-diagnoses whether at least one of the displacement sensors is abnormal.

Further, it is configured such that the geometric relationship is a relationship in which a difference between the outputs of the displacement sensors located at opposite positions is a predetermined value.

Further, it is configured such that the predetermined value is zero or a value close thereto.

Further, it is configured such that a plurality of the elastic members (cylindrical rubber members 382) are installed in the space defined by the first and second rigid members at separate locations in top view, and the displacement sensors 70 are each housed in the elastic members.

Further, it is configured such that a plurality of the elastic members (cylindrical rubber members 382) are installed in the space defined by the first and second rigid members at separate locations in top view, and the displacement sensors 70 are installed in the vicinity of the elastic members.

Further, it is configured in the third embodiment such that, in a floor reaction force detection system of a legged mobile robot 1 having at least a body 24 and a plurality of legs 2 each connected to the body through a first joint (hip joints 10, 12, 14), and each having a foot 22 connected to a distal end of the leg through a second joint (ankle joints 18, 20), there are provided with a displacement sensor 70 in or in the vicinity of an elastic member (cylindrical rubber member 382) positioned between the second joint and a floor contact end of the foot that produces output indicative of a displacement of the floor contact end of the foot relative to the second joint h (Ln), and a floor reaction force calculator (control unit 26) that calculates the floor reaction forces Ffbz, Mfbx, Mfby acting on the foot based on the output of the displacement sensors by using a model that describes a relationship between the displacement h (Ln) and stress Fn generated in the elastic members in response to the aforesaid displacement.

Further, it is configured such that the model is described by a first spring (spring having the spring constant Kb shown in FIG. 6), a dumper (dumper having the dumping constant D) arranged in series with the first spring and a second spring (spring having the spring constant Ka) arranged in parallel with the first spring and dumper.

Further, it is configured such that the floor reaction force calculator includes an observer 90 that estimates the floor reaction force by estimating displacement Xn of the dumper.

Further, it is configured such that the floor reaction force calculated by the floor reaction force calculator includes at least the force component Ffbz acting in the vertical-axis direction.

Further, it is configured such that a plurality of the displacement sensors are located to be apart from each other (locally) when viewed from top and the floor reaction force calculator calculates the floor reaction force on the basis of the outputs of the respective plural displacement sensors,.

Furthermore, it is configured such that the floor reaction force calculated by the floor reaction force calculator includes the force component Ffbz acting in the vertical-axis direction and the moment components Mfbx, Mfby acting about the axis that orthogonally intersects the vertical-axis.

Further, it is configured to have a second floor reaction force detector (six-axis force sensor 34) installed at a position between the second joint (ankle joint 18, 20) and the contact end of the foot that generates the outputs indicating floor reaction forces Ffsx, Mfsx, Mfsy acting on the foot from the floor surface which the robot 1 contacts.

Furthermore, it is configured to have a self-diagnoser (control unit 26, S100 to S122) that self-diagnoses whether abnormality or degradation occurs in at least one of the displacement sensors 70 or the floor reaction force detector based on the floor reaction forces Ffbz, Mfbx, Mfby calculated by the floor reaction force calculator and the floor reaction forces Ffsz, Mfsx, Mfsy detected from the outputs of the second floor reaction force detector.

Further, it is configured such that the self-diagnoser includes a first determiner (control unit 26, S108 to S112) that determines whether at least one of differences or ratios between the floor reaction forces calculated by the floor reaction force calculator and that detected from the outputs of the second floor reaction force detector, more specifically errors Fferrz, Mferrx, Mferry, are within a first predetermined range, and self-diagnoses that at least one of the displacement sensors, the second floor reaction force detector and the elastic members degrades when it is determined that at least one of the differences or ratios are not within the first determined range (control unit 26, S108 to S112).

Further, it is configured such that the self-diagnoser includes a second determiner (control unit 26, S114 to S118) that determines whether at least one of the differences or ratios between the floor reaction forces calculated by the floor reaction force calculator and that detected from the outputs of the second floor reaction force detector, more specifically errors Fferrz, Mferrx, Mferry, are within a second predetermined range, and self-diagnoses that the second floor reaction force detector is abnormal when it is determined that at least one of the differences or ratios are not within the second determined range (control unit 26, S120, S122).

Furthermore, it is configured such that the self-diagnoser includes a counter (control unit 26, S108) that counts the number of times that it is determined that one of the differences or ratios are not within the first predetermined range, and self-diagnoses that at least one of the displacement sensors, the floor reaction force detector and the elastic members degrades when the counted number of times (count value C) exceeds a predetermined number of times (predetermined value Cref) (control unit 26, S110 to S112).

It is configured in the eighth and ninth embodiments such that, in a floor reaction force detection system of a legged mobile robot 1 having at least a body 24 and a plurality of legs 2 each connected to the body through a first joint (hip joints 10, 12, 14), and each having a foot 22 connected to a distal end of the leg through a second joint (ankle joints 18, 20), there are provided with a plurality of displacement sensors 70 in or near an elastic member (cylindrical rubber member 382) positioned between the second joint and the floor contact end of the foot that produces outputs indicative of a displacement of the floor contact end of the foot relative to the second joint h (Ln), and a floor reaction force detector (six-axis force sensor 34) installed at a position between the second joint and the floor contact end of the foot that generates outputs indicating floor reaction forces Ffsz, Mfsx, Mfsy acting on the foot from the floor surface which the robot contacts; and the adaptive observer 100 (more specifically estimator having the adaptive observer 100 (control unit 26, S200 to S224) that outputs floor reaction force estimated errors Fferrz, Mferrx, Mferry indicating errors between floor reaction forces F̂fbz, M̂fbx, M̂fby estimated from the displacement sensors and floor reaction forces Ffsz, Mfsx, Mfsy detected from the outputs of the floor reaction force detector by using a model describing a relationship between the displacement h (Ln) and stress Fn of the elastic members generated in response to the aforesaid displacement, on the basis of the outputs h, θx, θy of the displacement sensors and the floor reaction forces Ffsz, Mfsx, Mfsy detected from the outputs of the floor reaction force detector, and identifies the model's parameter values Ka, Kb, D.

Further, it is configured to have an elastic member self-diagnoser (control unit 26, S218) that self-diagnoses degradation of the elastic members based on the parameter values K̂a, K̂b, D̂.

Furthermore, it is configured such that the adaptive observer 100 is installed for each foot 22, i.e., each of the right and left feet (i.e., the adaptive observer 100R and 100L), separately.

Further, it is configured such that the adaptive observer 100 is installed one for all of the feet 22, i.e., the two feet 22.

Further, it is configured such that the parameter values Ka, Kb, D, specifically parameter values K̂a+ΔKaave, K̂b+ΔKbave, D̂+ΔDave standardized at a parameter-standardizing processing block 104 are used in the plural adaptive observers 100R, 100L in common.

Further, it is configured to have a floor reaction force detector self-diagnoser (control unit 26, S102 to S122) that self-diagnoses abnormality in the floor reaction force detector based on the floor reaction force estimated errors Fferrz, Mferrx, Mferry.

Further, it is configured such that the model approximates the viscoelastic characteristic of the elastic members by springs (spring constants Ka, Kb) and a dumper (dumper constant D), and the parameter values are made of the spring constants Ka, Kb and dumper constant D.

It should be noted that, although the pressure-sensitivity sensor of electrostatic type is used in the displacement sensors in the above, the invention should not be limited thereto. It is alternatively possible to use other sensors of a piezoelectric, strain gage or eddy-current type.

It should further be noted that, although the invention has been described with reference to a biped mobile robot in the above, the invention can also be applied to any other legged mobile robots having legs of three or more.

INDUSTRIAL FIELD IN WHICH THE INVENTION IS APPLICABLE

According to the invention, it is arranged to install displacement sensors in or near elastic members, that generates outputs indicating a displacement of the floor contact end of the foot relative to an ankle joint, and the floor reaction force acting on the foot is calculated based on the outputs of the displacement sensors by using a model describing a relationship between the displacement and stress generated in the elastic members. With this, the floor reaction force can be accurately calculated and a legged mobile robot can be controlled to walk more stably. Further, it is arranged to have a dual sensory system by combining different types of detectors, thereby enhancing the detection accuracy. Further, since it self-diagnoses whether abnormality or degradation occurs in displacement sensors and conducts temperature compensation without using a temperature sensor, the detection accuracy can be further enhanced. The invention can thus apply to the legged mobile robot or the like.

The invention claimed is:

1. A floor reaction force detection system of a legged mobile robot having at least a body and a plurality of legs each connected to the body through a first joint, and each having a foot connected to a distal end of the leg through a second joint, comprising:
   (a) a displacement sensor installed at a position in or adjacent to an elastic member that contracts in response to a load and is disposed between the second joint and a floor contact end of the foot, and generating an output indicating a displacement of the floor contact end of the foot relative to the second joint; and
   (b) a floor reaction force calculator that calculates a floor reaction force acting on the foot based on the output of the displacement sensor, by using a model that describes a relationship between a displacement and a stress generated in the elastic member in response to the displacement of the floor contact end of the foot.

2. The system according to claim 1, wherein the model is described with a first spring, a dumper arranged in series with the first spring and a second spring arranged in parallel with the first spring and the dumper.

3. The system according to claim 2, wherein the floor reaction force calculator includes an observer that estimates the floor reaction force by estimating a displacement of the dumper.

4. The system according to claim 1, wherein the floor reaction force calculated by the floor reaction force calculator includes at least a force component acting in a direction of vertical axis.

5. The system according to claim 1, wherein a plurality of the displacement sensors are disposed to be apart from each other when viewed from top and the floor reaction force calculator calculates the floor reaction force based on outputs of the displacement sensors.

6. The system according to claim 5, wherein the floor reaction force calculated by the floor reaction force calculator includes a force component acting in a direction of vertical axis and a moment component acting about an axis that orthogonally intersects the vertical axis.

7. The system according to claim 1, wherein the displacement sensor comprises a spring and a pressure-sensitivity sensor.

8. The system according to claim 7, wherein a rigidity of the spring is set lower than that of the elastic member.

9. The system according to claim 1, further including;
   a second floor reaction force detector installed at a position between the second joint and the floor contact end of the foot and generating an output indicating a floor reaction force acting on the foot from the floor surface which the robot contacts.

10. The system according to claim 9, further including;
   (c) a self-diagnoser that self-diagnoses whether abnormality or degradation occurs in at least one of the displacement sensor and the second floor reaction force detector based on the floor reaction force calculated by the floor reaction force calculator and the floor reaction force detected from the output of the second floor reaction force detector.

11. The system according to claim 10, wherein the self-diagnoser includes;
   (d) a first determiner that determines whether at least one of a difference and a ratio between the floor reaction force calculated by the floor reaction force calculator and the floor reaction force detected from the output of the second floor reaction force detector is within a first predetermined range;

and self-diagnoses that at least one of the displacement sensor, the second floor reaction force detector and the elastic member degrades when it is determined that at least one of the difference and the ratio is not within the first determined range.

12. The system according to claim 11, wherein the self-diagnoser includes;

(f) a counter counting a number of times that at least one of the difference and the ratio is determined to be not within the first predetermined range;

and self-diagnoses that at least one of the displacement sensor, the second floor reaction force detector and the elastic member degrades when the counted number of times exceeds a predetermined number of times.

13. The system according to claim 10, wherein the self-diagnoser includes;

(e) a second determiner that determines whether at least one of a difference and a ratio between the floor reaction force calculated by the floor reaction force calculator and the floor reaction force detected from the output of the second floor reaction force detector is within a second predetermined range;

and self-diagnoses that the second floor reaction force detector is abnormal when it is determined that at least one of the difference and the ratio is not within the second predetermined range.

14. A floor reaction force detection system of a legged mobile robot having at least a body and a plurality of legs each connected to the body through a first joint, and each having a foot connected to a distal end of the leg through a second joint, comprising:

(a) a displacement sensor installed at a position in or adjacent to an elastic member disposed between the second joint and a floor contact end of the foot, and generating an output indicating a displacement of the floor contact end of the foot relative to the second joint;

(b) a floor reaction force detector installed at a position between the second joint and the floor contact end of the foot and generating an output indicating a floor reaction force acting on the foot from the floor surface which the robot contacts; and (c) an adaptive observer that outputs a floor reaction force estimation error indicating a difference between a floor reaction forces estimated from the output of the displacement sensor and the floor reaction force detected from the output of the floor reaction force detector, using a model that describes a relationship between a displacement and a stress generated in the elastic member in response to the displacement of the floor contact end of the foot, and identifying a parameter value of the model.

15. The system according to claim 14, further including;

(d) an elastic member self-diagnoser that self-diagnoses degradation of the elastic members based on at least the parameter value.

16. The system according to claim 14, wherein the adaptive observer is separately installed for each foot.

17. The system according to claim 16, wherein the parameter value is used in the adaptive observers in common.

18. The system according to claim 14, wherein the adaptive observer is installed one for the feet.

19. The system according to claim 14, further including;

(e) a floor reaction force detector self-diagnoser that self-diagnoses an abnormality of the floor reaction force detector based on the floor reaction force estimation errors.

20. The system according to claim 14, wherein the model is a model in which a viscoelastic characteristic of the elastic member is approximated by a spring and a dumper, and the parameter value is made of a constant of the spring and the dumper.

* * * * *